United States Patent
Irie et al.

(10) Patent No.: US 11,886,643 B2
(45) Date of Patent: Jan. 30, 2024

(54) INFORMATION PROCESSING APPARATUS AND INFORMATION PROCESSING METHOD

(71) Applicant: SONY GROUP CORPORATION, Tokyo (JP)

(72) Inventors: Atsushi Irie, Tokyo (JP); Kenji Gotoh, Tokyo (JP); Yugo Sato, Tokyo (JP); Junji Otsuka, Tokyo (JP); Tetsuo Ikeda, Tokyo (JP); Seishi Tomonaga, Tokyo (JP); Eisuke Fujinawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 188 days.

(21) Appl. No.: 17/294,486

(22) PCT Filed: Oct. 28, 2019

(86) PCT No.: PCT/JP2019/042092
§ 371 (c)(1),
(2) Date: May 17, 2021

(87) PCT Pub. No.: WO2020/110547
PCT Pub. Date: Jun. 4, 2020

(65) Prior Publication Data
US 2022/0019288 A1     Jan. 20, 2022

(30) Foreign Application Priority Data
Nov. 26, 2018    (JP) ................................. 2018-220508

(51) Int. Cl.
*G06F 3/01*         (2006.01)
*G06V 40/20*     (2022.01)

(52) U.S. Cl.
CPC .............. *G06F 3/017* (2013.01); *G06F 3/011* (2013.01); *G06V 40/20* (2022.01)

(58) Field of Classification Search
CPC .......... G06F 3/012; G06F 3/011; G06V 40/20
See application file for complete search history.

(56) References Cited

U.S. PATENT DOCUMENTS

| 5,714,698 A | 2/1998 | Tokioka et al. |
| 6,434,255 B1 | 8/2002 | Harakawa |
| 9,984,519 B2* | 5/2018 | Herman ................. G06V 40/25 |
| 2013/0307775 A1* | 11/2013 | Raynor .................. G06F 3/021 |
| | | 345/158 |

FOREIGN PATENT DOCUMENTS

EP           913790 A1    5/1999

OTHER PUBLICATIONS

International Search Report and Written Opinion of PCT Application No. PCT/JP2019/042092, dated Dec. 10, 2019, 09 pages of ISRWO.

* cited by examiner

*Primary Examiner* — Albert K Wong
(74) *Attorney, Agent, or Firm* — CHIP LAW GROUP

(57) ABSTRACT

Provided is an information processing apparatus that includes a relative velocity calculation unit that calculates, on the basis of data obtained by sensing of an operation body in chronological order, a relative velocity of a second point on the operation body with respect to a first point on the operation body, and a gesture recognition unit that recognizes a gesture of the operation body on the basis of the relative velocity.

19 Claims, 26 Drawing Sheets

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/042092 filed on Oct. 28, 2019, which claims priority benefit of Japanese Patent Application No. JP 2018-220508 filed in the Japan Patent Office on Nov. 26, 2018. Each of the above-referenced applications is hereby incorporated herein by reference in its entirety.

TECHNICAL FIELD

The present disclosure relates to an information processing apparatus, an information processing method, and a program.

BACKGROUND ART

In recent years, technologies are known in which, in a case where a plurality of commands is associated with an object to be operated, a command to be executed, among the plurality of commands associated with the object, is determined on the basis of a movement of an operation body. For example, a technology is disclosed in which a command to be executed, among a plurality of commands associated with an object, is determined on the basis of a moving velocity (absolute velocity) of an operation body (e.g., Patent Document 1).

CITATION LIST

Patent Document

Patent Document 1: Japanese Patent Application Laid-Open No. 2012-58882

SUMMARY OF THE INVENTION

Problems to be Solved by the Invention

Nevertheless, it is desired to provide a technology that enables recognition of a gesture made by an operation body with higher accuracy.

Solutions to Problems

The present disclosure provides an information processing apparatus that includes a relative velocity calculation unit that calculates, on the basis of data obtained by sensing of an operation body in chronological order, a relative velocity of a second point on the operation body with respect to a first point on the operation body, and a gesture recognition unit that recognizes a gesture of the operation body on the basis of the relative velocity.

The present disclosure provides an information processing method that includes calculating, on the basis of data obtained by sensing of an operation body in chronological order, a relative velocity of a second point on the operation body with respect to a first point on the operation body, and recognizing, by a processor, a gesture of the operation body on the basis of the relative velocity.

The present disclosure provides a program for causing a computer to function as an information processing apparatus that includes a relative velocity calculation unit that calculates, on the basis of data obtained by sensing of an operation body in chronological order, a relative velocity of a second point on the operation body with respect to a first point on the operation body, and a gesture recognition unit that recognizes a gesture of the operation body on the basis of the relative velocity.

MODE FOR CARRYING OUT THE INVENTION

Figure 1:
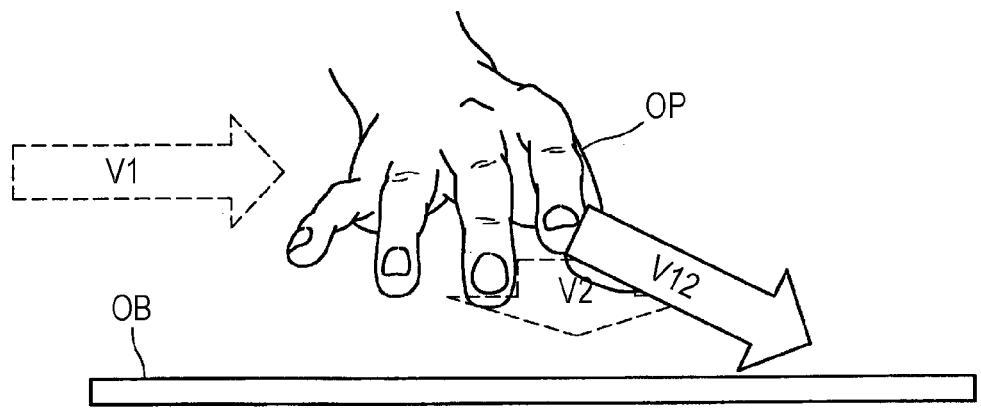
FIG. 1 is a diagram for describing a point to be improved in a well-known technology.

Preferred embodiments of the present disclosure will be described below in detail with reference to the accompanying drawings. Note that, in the present specification and drawings, components having substantially the same functional configurations are denoted by the same reference numerals, and the description thereof will thus not be repeated.

Furthermore, in the present specification and the drawings, a plurality of components having substantially the same or similar functional configurations may be distinguished from each other by different numbers added after the same reference numeral. However, in a case where there is no particular need to distinguish between a plurality of components having substantially the same or similar functional configuration, such components are denoted just by the same reference numeral. Furthermore, similar components in different embodiments may be distinguished from each other by different alphabets added after the same reference numeral. However, in a case where there is no particular need to distinguish between similar components, such components are denoted just by the same reference numeral.

Note that the description will be given in the following order.

0. Outline
1. First Embodiment
   1.1. Configuration example of information processing system
   1.2. Configuration example of information processing apparatus
   1.3. Operation example of information processing system
2. Second Embodiment
   2.1. Configuration example of information processing system
   2.2. Operation example of information processing system
3. Third Embodiment
   3.1. Configuration example of information processing system
   3.2. Operation example of information processing system
4. Fourth Embodiment
   4.1. Configuration example of information processing system
   4.2. Operation example of information processing system
5. Fifth Embodiment
   5.1. Configuration example of information processing system
   5.2. Operation example of information processing system
6. Sixth Embodiment
   6.1. Configuration example of information processing system
   6.2. Operation example of information processing system
7. Seventh Embodiment
   7.1. Configuration example of information processing system
   7.2. Operation example of information processing system
8. Hardware configuration example
9. Conclusion 0. Outline In recent years, technologies are known in which, in a case where a plurality of commands is associated with an object to be operated, a command to be executed, among the plurality of commands associated with the object, is determined on the basis of a movement of an operation body. For example, a technology is disclosed in which a command to be executed, among a plurality of commands associated with an object, is determined on the basis of a moving velocity (absolute velocity) of an operation body. A point to be improved in such a well-known technology will be described below with reference to FIG. 1.

FIG. 1 is a diagram for describing a point to be improved in the well-known technology. Referring to FIG. 1, an index finger is illustrated as an example of an operation body OP. Furthermore, in the well-known technology, a command is executed in accordance with an absolute velocity of the fingertip of the index finger. Specifically, in a case where an object OB to be operated is a piano keyboard, a command to output a sound of the piano (hereinafter also referred to as a "piano sound") is executed in a case where the absolute velocity of the fingertip exceeds a threshold value. On the other hand, in a case where the absolute velocity of the fingertip is lower than the threshold value, the command to output a piano sound is not executed.

Here, as illustrated in FIG. 1, a case is assumed in which a user, who is trying to perform a key input, moves a fingertip downward at a relative velocity V2 of the fingertip with respect to a palm to perform the key input while moving the palm toward the right of a paper surface at an absolute velocity V1 in order to change the key to be used for the key input. At this time, an absolute velocity V12 of the fingertip is a velocity obtained by combining the absolute velocity V1 of the palm and the relative velocity V2 of the fingertip with respect to the palm. That is, in the well-known technology, it is difficult to recognize a key input (gesture made by an operation body) with high accuracy because whether a key input has been performed is determined in consideration of a velocity component due to a change of the key to be used for a key input.

Thus, in the present specification, a technology for recognizing a gesture made by an operation body (a key input in the example illustrated in FIG. 1) on the basis of a relative velocity of a second point (hereinafter also referred to as an "operation point") of the operation body with respect to a first point (hereinafter also referred to as a "reference point") of the operation body (the relative velocity V2 of the fingertip with respect to the palm in the example illustrated in FIG. 1) is proposed. This makes it possible to recognize a gesture made by an operation body with higher accuracy. Note that the type of operation body is not limited to an index finger as will be described later, and may be another finger, may be a part of a user's body other than fingers, or may not be a user's body.

The outline of the embodiments of the present disclosure has been described above.

1. First Embodiment

1.1. Configuration Example of Information Processing System

Figure 2:
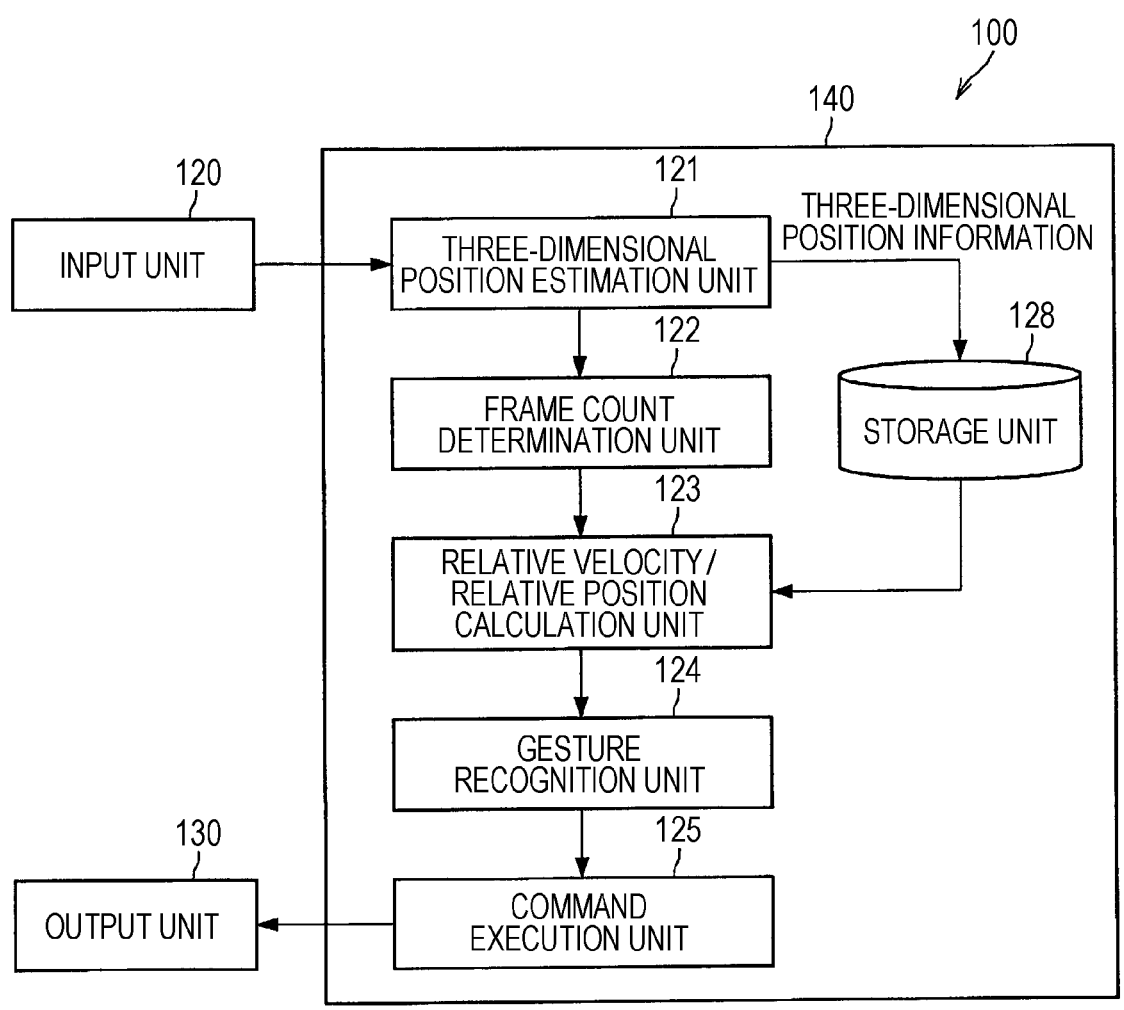
FIG. 2 is a diagram illustrating a functional configuration example of an information processing system according to a first embodiment of the present disclosure.

Next, a configuration example of an information processing system according to a first embodiment of the present disclosure will be described with reference to the drawings. FIG. 2 is a diagram illustrating a functional configuration example of the information processing system according to the first embodiment of the present disclosure. As illustrated in FIG. 2, an information processing system 100 includes an input unit 120 and an output unit 130. Furthermore, the information processing system 100 includes an information processing apparatus 140 (computer). The information processing apparatus 140 includes a three-dimensional position estimation unit 121, a frame count determination unit 122, a relative velocity/relative position calculation unit 123, a gesture recognition unit 124, a command execution unit 125, and a storage unit 128.

The input unit 120 includes an input device, and acquires data (input information) by sensing an operation body (more specifically, a part or the whole of the shape, a movement, and the like of the operation body) in chronological order. In the first embodiment of the present disclosure, the input unit 120 accepts the shape, a movement, and the like of a user's body as examples of the input information. However, as described above, the type of operation body is not limited to a user's body. Furthermore, the input information acquired by the input unit 120 may be two-dimensional data, or may be three-dimensional data.

Specifically, the input unit 120 may include an image sensor and a depth sensor. However, the input unit 120 may not include all of these sensors, but may include at least one of these sensors. Alternatively, the input unit 120 may include a touch sensor. The following mainly assumes a case where the shape, a movement, and the like of an operation body are acquired by the image sensor. However, there is no limitation on which sensor acquires these pieces of information.

Note that, as the image sensor, a visible light camera or an infrared camera may be used. As the depth sensor, a stereo camera, a time of flight (TOF) sensor, or a structured light-based distance image sensor may be used. The touch sensor may be a camera that captures an image from above or below, or may be a touch panel laid on a projection surface.

The output unit 130 includes an output device, and outputs information in accordance with a command executed by the command execution unit 125. The following mainly assumes a case where the output unit 130 includes a projector and the projector outputs information by projecting the information onto a projection surface. However, the output unit 130 is not limited to the case where the projector is included. For example, the output unit 130 may be a touch panel type display, a liquid crystal display (LCD), an organic electro-luminescence (EL) display, or the like.

The surface on which information is output by the output unit 130 may correspond to a display surface. In particular, in a case where a projector is used as the output device, the display surface may correspond to a projection surface (e.g., a table surface) on which information is projected by the projector. The following description mainly assumes a case where a projection surface is used as the display surface, but the display surface is not limited to a projection surface. Furthermore, the area on which information is projected by the projector is not limited to a table surface. For example, the area on which information is projected by the projector may be a floor surface, a wall surface, an object, or the like.

The details of the information processing apparatus 140 will be described in detail later. Here, the information processing system 100 according to the first embodiment of the present disclosure may adopt a variety of modes. As examples of such modes of the information processing system 100 according to the first embodiment of the present disclosure, first to fourth examples will be described below. However, a mode of the information processing system 100 according to the first embodiment of the present disclosure is not limited to any of the first to fourth examples.

Figure 3:
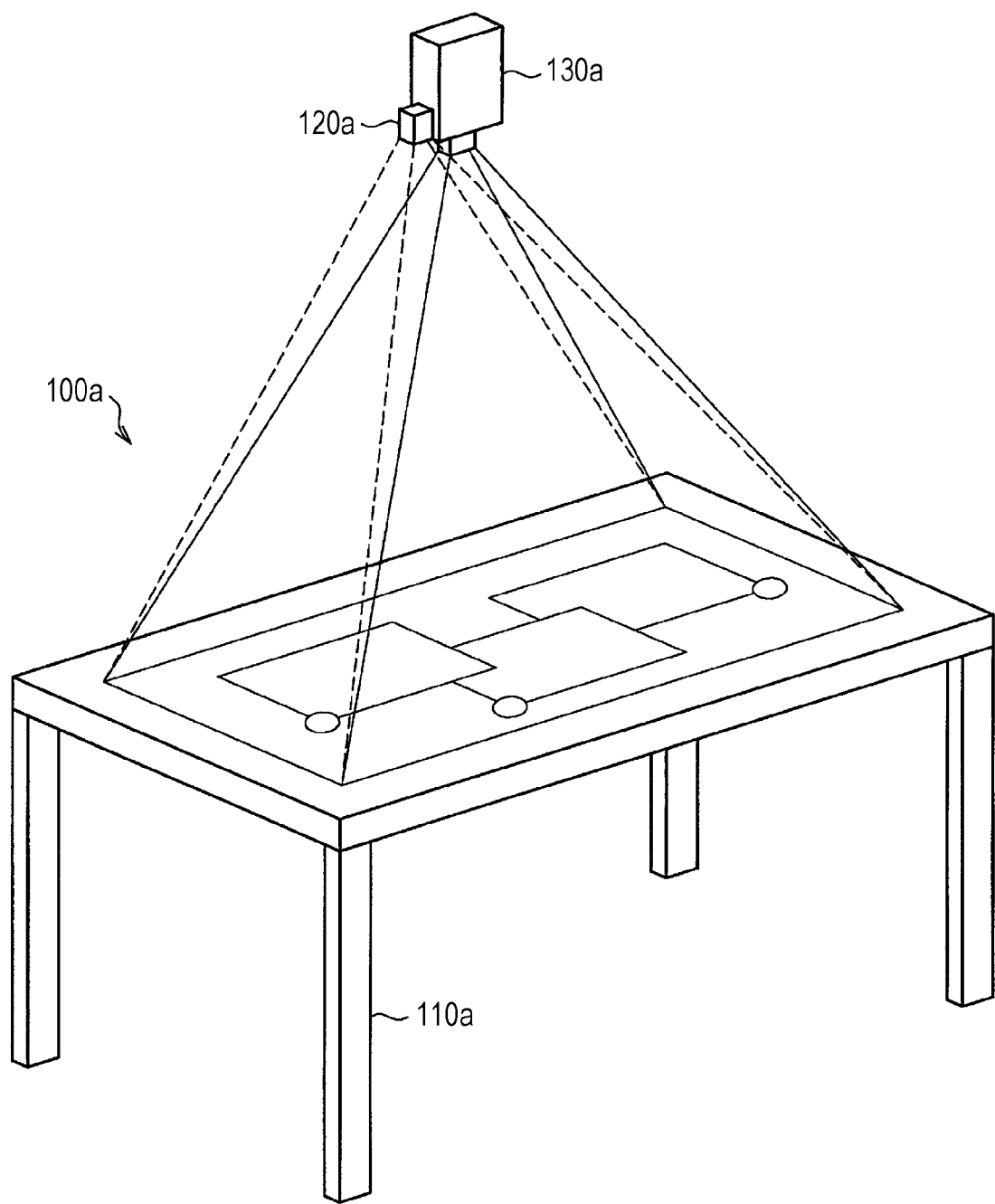
FIG. 3 is an explanatory diagram illustrating a first example of a mode of the information processing system according to the same embodiment.

FIG. 3 is an explanatory diagram illustrating the first example of the mode of the information processing system 100 according to the first embodiment of the present disclosure. As illustrated in FIG. 3, an information processing system 100a as the first example includes an input unit 120a and an output unit 130a. The information processing system 100a displays information on the top surface of a table 110a, and allows a user to operate the information displayed on the table 110a. The method of displaying information on the top surface of the table 110a in this way is also referred to as "projection type".

The input unit 120a accepts an operation by a user, the shape or a pattern of an object placed on the table 110a, or the like as input information. In the example illustrated in FIG. 3, the input unit 120a is provided above the table 110a in a state of being suspended from a ceiling. The method of projecting information by the output unit 130a from above the table 110a and displaying the information on the top surface of the table 110a in this way is also referred to as "above projection type". As the input unit 120a, a camera that images the table 110a with one lens may be used, a stereo camera that can image the table 110a with two lenses and record information in the depth direction may be used, or a microphone for collecting voice uttered by a user or environmental sound may be used.

In a case where the camera that images the table 110a with one lens is used as the input unit 120a, the information processing system 100a can recognize an object placed on the table 110a by analyzing an image captured by the camera. Furthermore, in a case where the stereo camera is used as the input unit 120a, the information processing system 100a can recognize an object (a hand or the like) placed on the table 110a on the basis of depth information acquired by the stereo camera. Furthermore, the information processing system 100a can recognize contact of a user's hand with the table 110a and withdrawal of the hand from the table 110a on the basis of the depth information.

Furthermore, in a case where the microphone is used as the input unit 120a, the microphone used may be a microphone array for collecting voice in a specific direction. In a case where the microphone array is used as the input unit 120a, the information processing system 100a may adjust a sound collecting direction of the microphone array to any direction.

The output unit 130a displays information on the table 110a and outputs voice in accordance with input information. As the output unit 130a, a projector, a speaker, or the like can be used. In the example illustrated in FIG. 3, the output unit 130a is provided above the table 110a in a state of being suspended from the ceiling. In a case where the output unit 130a is constituted by a projector, the output unit 130a projects information onto the top surface of the table 110a. In a case where the output unit 130a is constituted by a speaker, the output unit 130a outputs voice on the basis of an audio signal. At this time, the number of speakers may be one, or may be two or more. In a case where the output unit 130a is constituted by a plurality of speakers, the information processing system 100a may limit from which speaker voice is to be output or adjust the direction in which voice is to be output.

Furthermore, in a case where the information processing system 100 according to the first embodiment of the present disclosure is the projection type information processing system 100a as illustrated in FIG. 3, the output unit 130a may include lighting equipment. In a case where the output unit 130a includes lighting equipment, the information processing system 100a may control the state of the lighting equipment such as "light turned on" or "light turned off" on the basis of the content of input information accepted by the input unit 120a. Furthermore, in a case where the information processing system 100 according to the first embodiment of the present disclosure is the above projection type information processing system 100a as illustrated in FIG. 3, it is possible to display information not only on the table 110a but also on an object placed on the table 110a.

A user can use a finger or the like to perform various operations on the information displayed on the table 110a by the output unit 130a. Furthermore, a user can place an object on the table 110a and allow the input unit 120a to recognize the object so that the information processing system 100a may execute various kinds of processing related to the object.

Figure 4:
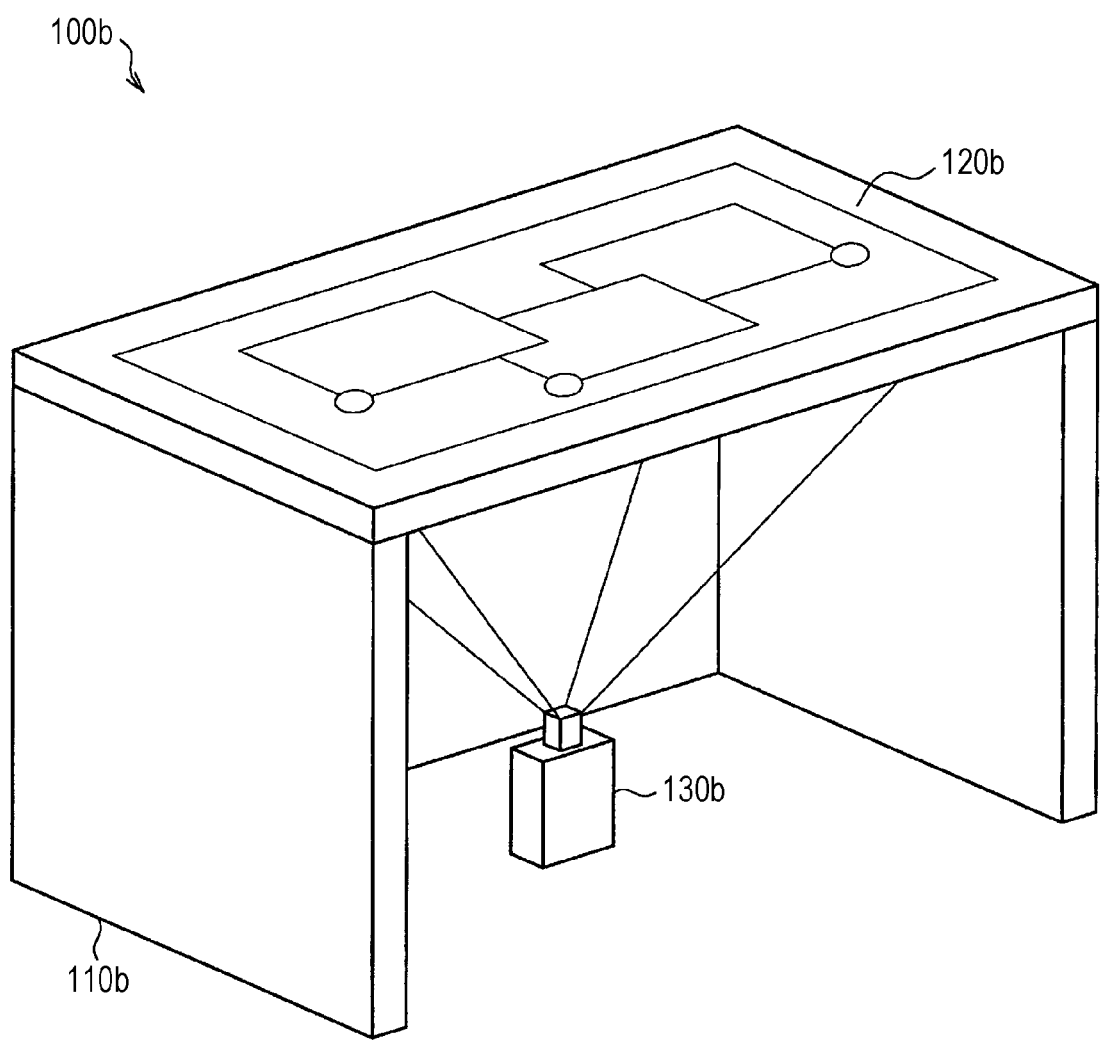
FIG. 4 is an explanatory diagram illustrating a second example of the mode of the information processing system according to the same embodiment.

FIG. 4 is an explanatory diagram illustrating the second example of the mode of the information processing system 100 according to the first embodiment of the present disclosure. As illustrated in FIG. 4, an information processing system 100b as the second example displays information on the top surface of a table 110b by projecting the information from below the table 110b by the output unit 130a. The top surface of the table 110b may be a translucent screen formed with use of a semi-transparent material such as a glass plate or a plastic plate. The method of projecting information from below the table 110b by the output unit 130a and displaying the information on the top surface of the table 110b in this way is also referred to as "rear projection type".

Note that the example illustrated in FIG. 4 shows a configuration in which an input unit 120b is provided on the surface of the table 110b. However, the position where the input unit 120b is provided is not limited. For example, in a similar manner to the information processing system 100a illustrated in FIG. 4, the input unit 120b may be provided below the table 110b at a distance from the table 110b.

Figure 5:
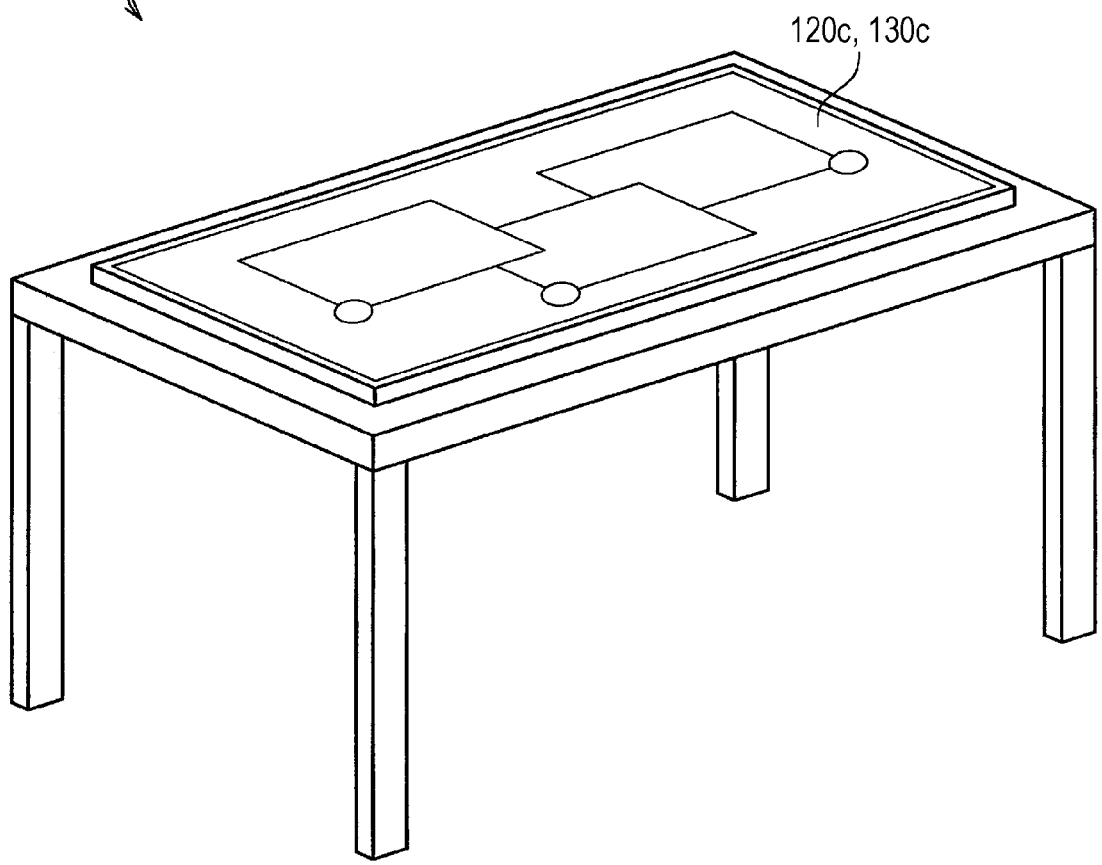
FIG. 5 is an explanatory diagram illustrating a third example of the mode of the information processing system according to the same embodiment.

FIG. 5 is an explanatory diagram illustrating the third example of the mode of the information processing system 100 according to the first embodiment of the present disclosure. As illustrated in FIG. 5, an information processing system 100c as the third example has a configuration in which a touch panel type display is placed on a table. The method of displaying information by a touch panel type display placed on a table in this way is also referred to as "lie-flat display type". An input unit 120c and an output unit 130c can be configured as a touch panel type display. In the information processing system 100c illustrated in FIG. 5, in a similar manner to the information processing system 100a illustrated in FIG. 3, a camera for detecting the position of a user may be provided above the touch panel type display.

Figure 6:
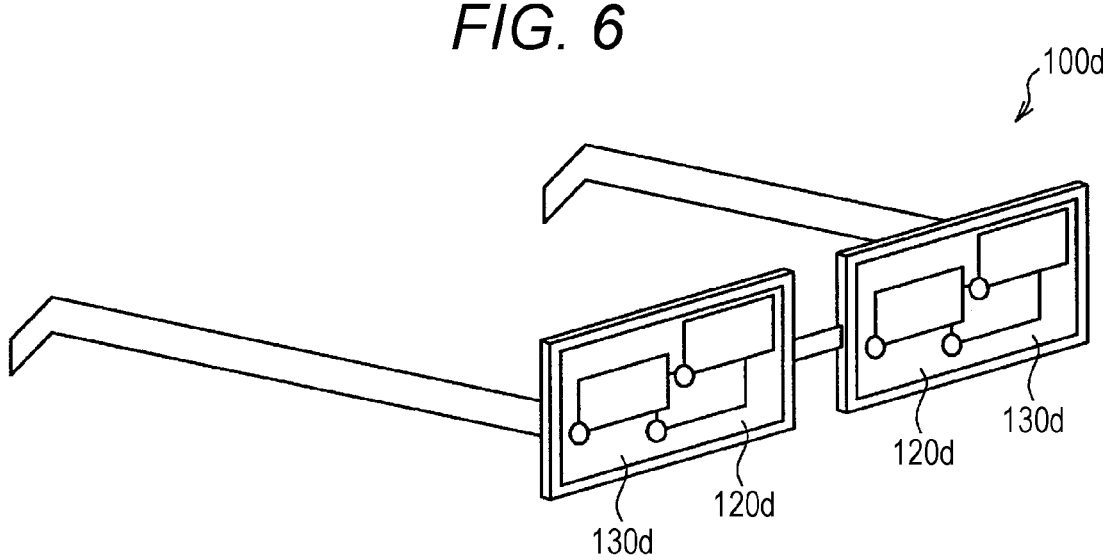
FIG. 6 is an explanatory diagram illustrating a fourth example of the mode of the information processing system according to the same embodiment.

FIG. 6 is an explanatory diagram illustrating the fourth example of the mode of the information processing system 100 according to the first embodiment of the present disclosure. As illustrated in FIG. 6, an information processing system 100d as the fourth example is constituted by an eyewear type terminal. An input unit 120d is constituted by a camera capable of imaging a user's field of view, and can accept, as input information, an image obtained by the imaging. Furthermore, an output unit 130d can be configured as a display that presents information in accordance with the input information in the user's field of view. For example, the output unit 130d is constituted by a transmissive display, and the user can see an external environment through the output unit 130d.

Note that the following description mainly assumes a case where the first example illustrated in FIG. 3 is used as the mode of the information processing system 100 according to the first embodiment of the present disclosure. That is, the following description mainly assumes a case where the input unit 120a and the output unit 130a are provided above the table 110a at a distance from the table 110a (information display surface). Thus, in the following description, the information processing system 100a, the input unit 120a, and the output unit 130a are also simply referred to as the information processing system 100, the input unit 120, and the output unit 130. However, as described above, the mode of the information processing system 100 according to the first embodiment of the present disclosure is not limited.

The configuration example of the information processing system 100 according to the first embodiment of the present disclosure has been described above.

1.2. Configuration Example of Information Processing Apparatus

Returning to FIG. 2, the description will be continued. Next, a configuration example of the information processing apparatus 140 will be described. The information processing apparatus 140 includes the three-dimensional position estimation unit 121, the frame count determination unit 122, the relative velocity/relative position calculation unit 123, the gesture recognition unit 124, and the command execution unit 125. These blocks are constituted by processing devices such as one or more central processing units (CPUs), for example. In a case where these blocks are constituted by a processing device such as a CPU, such a processing device may be constituted by an electronic circuit.

The three-dimensional position estimation unit 121 estimates three-dimensional positions of points on a user's body as an example of points on an operation body on the basis of input information acquired by the input unit 120. The points on the user's body may include points on a user's hand (e.g., a predetermined point on a finger or a predetermined point on a palm), a predetermined point on a wrist (e.g., a wrist position), and a predetermined point on an elbow (e.g., an elbow joint position). As an example of the points on the user's body to be estimated by the three-dimensional position estimation unit 121, points on the user's hand, the wrist position, and the elbow joint position will be described below. However, the points on the user's body may also include a predetermined point on a shoulder (e.g., a shoulder joint position).

Note that, in the following description, unless otherwise specified, a "finger" used as an example of an operation body means an index finger. However, the "finger" used as an example of the operation body may be a finger other than the index finger. Furthermore, unless otherwise specified, a thumb joint means the second joint from the tip of the thumb (the base of the thumb), and a joint of a finger other than the thumb (that is, the index finger, the middle finger, the ring finger, or the little finger) means the second joint from the tip of the finger. However, a thumb joint may mean the first joint from the tip of the thumb, and a joint of a finger other than the thumb may mean the first joint from the tip of the finger, or may mean the third joint from the tip of the finger (the finger base).

Figure 7:
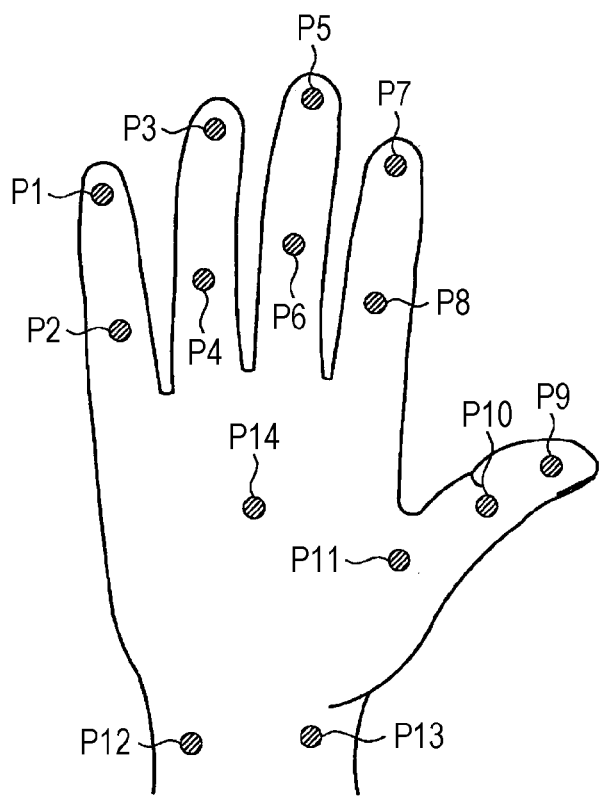
FIG. 7 is a diagram illustrating an example of points on a user's body whose three-dimensional positions are to be estimated by a three-dimensional position estimation unit.
Figure 8:
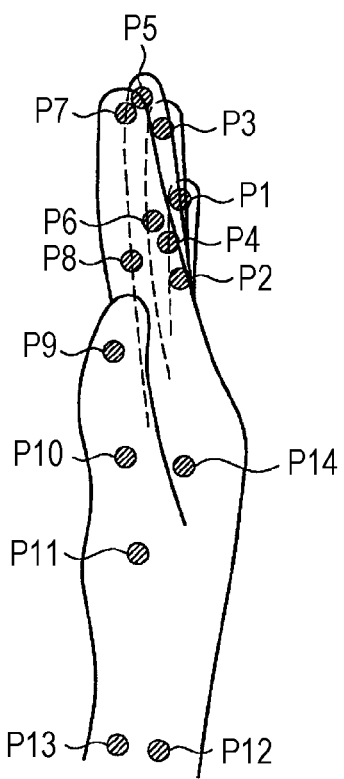
FIG. 8 is a diagram illustrating the example of the points on the user's body whose three-dimensional position are to be estimated by the three-dimensional position estimation unit.
Figure 9:
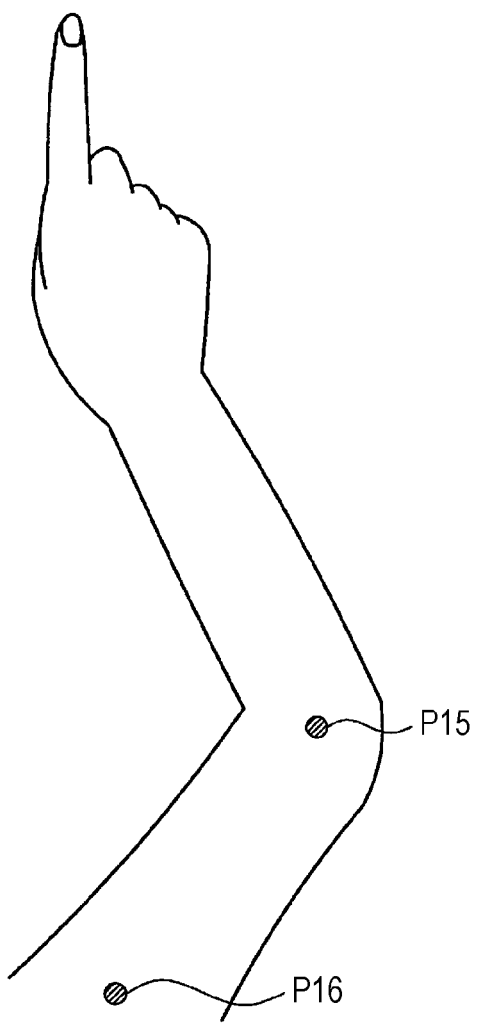
FIG. 9 is a diagram illustrating the example of the points on the user's body whose three-dimensional position are to be estimated by the three-dimensional position estimation unit.

FIGS. 7 to 9 are diagrams illustrating an example of the points on the user's body whose three-dimensional positions are to be estimated by the three-dimensional position estimation unit 121. Referring to FIGS. 7 to 9, as an example of the points on the user's body, a position P1 of the tip of the little finger, a position P2 of a joint of the little finger, a position P3 of the tip of the ring finger, a position P4 of a joint of the ring finger, a position P5 of the tip of the middle finger, a position P6 of a joint of the middle finger, a position P7 of the tip of the index finger, a position P8 of a joint of the index finger, a position P9 of the tip of the thumb, a position P10 of the first joint from the tip of the thumb, a position P11 of the second joint from the tip of the thumb, a wrist position (on the little finger side) P12, a wrist position (on the thumb side) P13, a position P14 of the center of the hand, an elbow joint position P15, and an upper arm base position P16 are illustrated.

The first embodiment of the present disclosure mainly assumes a case where all the positions P1 to P16 are acquired by the three-dimensional position estimation unit 121 in principle. However, the three-dimensional position estimation unit 121 may acquire only some of the positions P1 to P16. Furthermore, depending on the positional relationship between the input unit 120 and the user, a case may be assumed in which some of the positions P1 to P16 are not acquired, for example. For example, the upper arm base position P16 may not be acquired directly. Even in such a case, if any position between the elbow joint position P15 and the upper arm base position P16 is acquired, the position can be used in place of the upper arm base position P16.

Note that the position P14 of the center of the hand is not particularly limited as long as it is a predetermined position between the base of each of the five fingers and the wrist (that is, the palm). For example, the position P14 of the center of the hand may be a position of the center of gravity of a plurality of points. Furthermore, the wrist position (on the little finger side) P12 is only required to be either of the two positions obtained as wrist positions, whichever is closer to the thumb. The wrist position (on the thumb side) P13 is only required to be either of the two positions obtained as wrist positions, whichever is closer to the little finger. Each of the wrist position (on the little finger side) P12 and the wrist position (on the thumb side) P13 may also be appropriately changed in accordance with an algorithm for detecting each position or the like.

Figure 10:
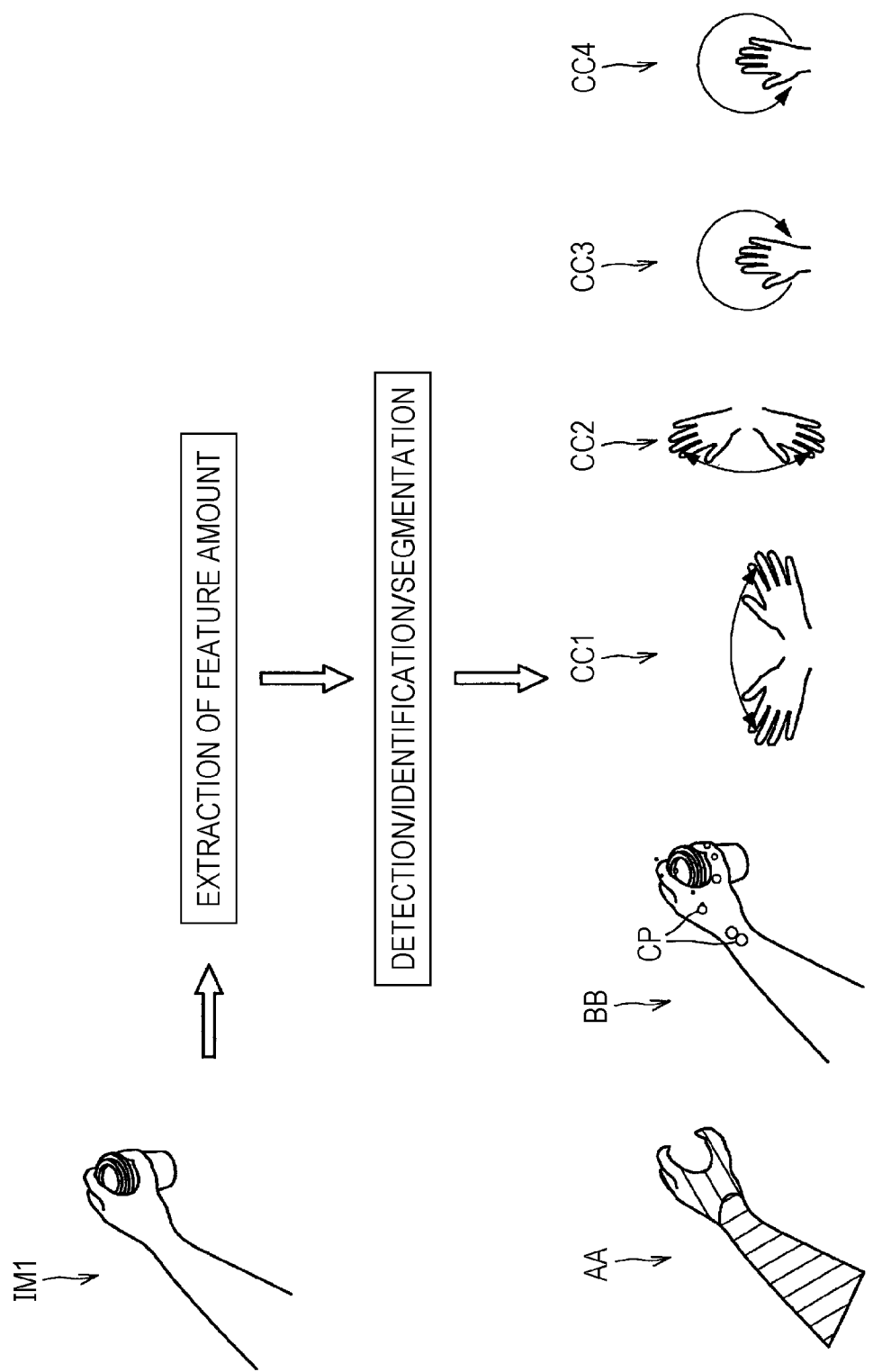
FIG. 10 is a diagram for describing an outline of a three-dimensional position estimation method.

Next, a three-dimensional position estimation method performed by the three-dimensional position estimation unit 121 will be described. FIG. 10 is a diagram for describing an outline of the three-dimensional position estimation method. Here, a case where the three-dimensional positions of the points on the hand are estimated will be mainly described. However, as described above, three-dimensional positions of points other than the points on the hand can also be estimated. For example, a case is assumed in which the input unit 120 has acquired an image (image IM1) of a coffee cup being grasped by hand. At this time, the three-dimensional position estimation unit 121 calculates a feature amount on the basis of the image IM1. Examples of the feature amount include a convolutional neural network (CNN)-based feature amount, a histograms of oriented gradients (HOG) feature amount, and a scale invariant feature transform (SIFT)-based feature amount.

Figure 11:
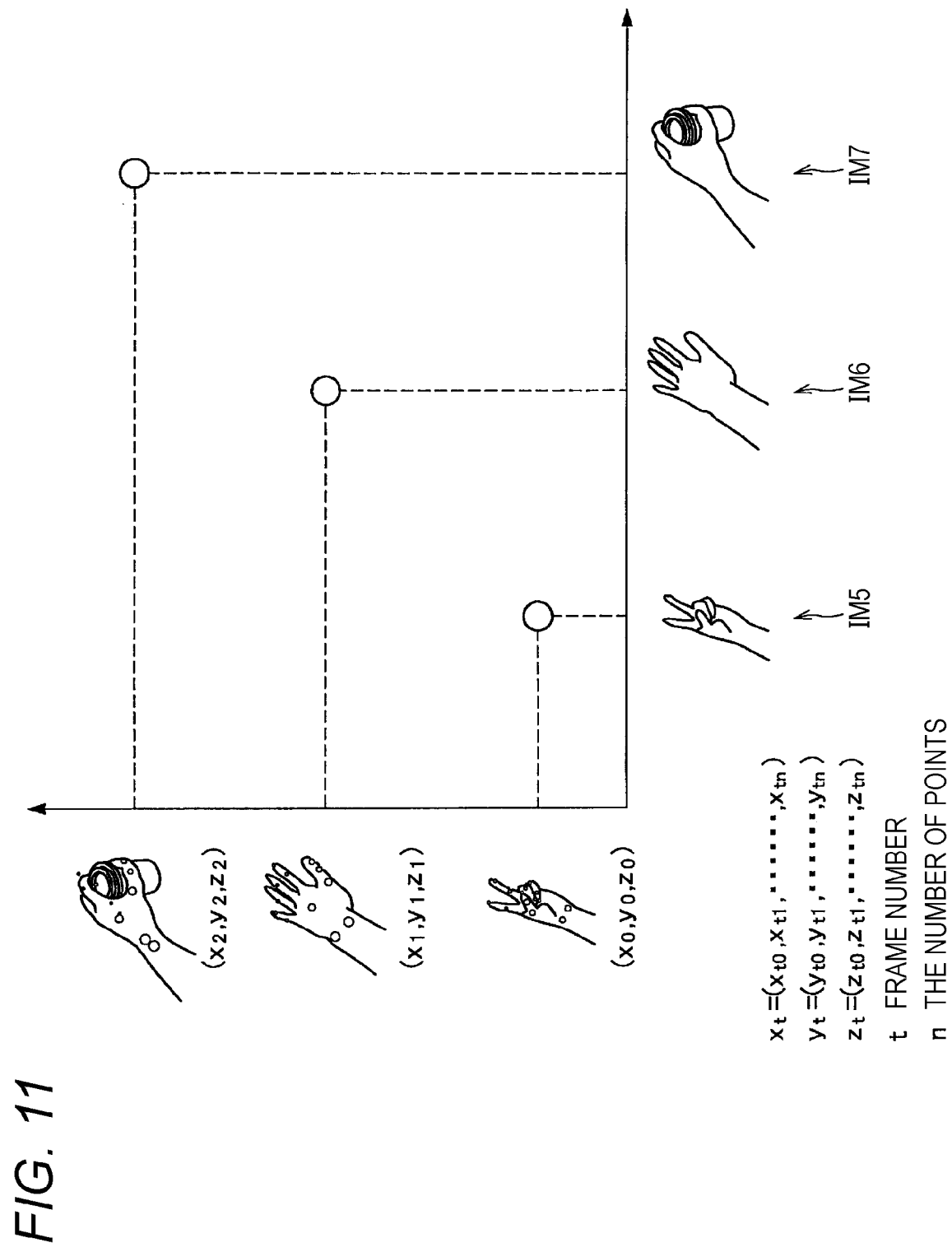
FIG. 11 is a diagram for describing an example of the three-dimensional position estimation method.

Next, examples of the three-dimensional position estimation method will be described with reference to FIGS. 11 to 13. A horizontal axis of a graph illustrated in FIG. 11 indicates an example of an input image. In the example illustrated in FIG. 11, three input images IM5, IM6, and IM7 are illustrated. A vertical axis of the graph illustrated in FIG. 11 indicates coordinates (positions) of feature points of a hand corresponding to the input images. The coordinates are represented by $(x_t, y_t, z_t)$, where t is a frame number. Furthermore, for example, $x_t$ is represented by $x_t=(x_{t0}, x_{t1} \ldots x_{tn})$, where n is the number of feature points. That is, $x_t$ indicates a set of x-coordinates of the feature points. The same applies to $y_t$ and $z_t$ of the feature points.

Figure 12:
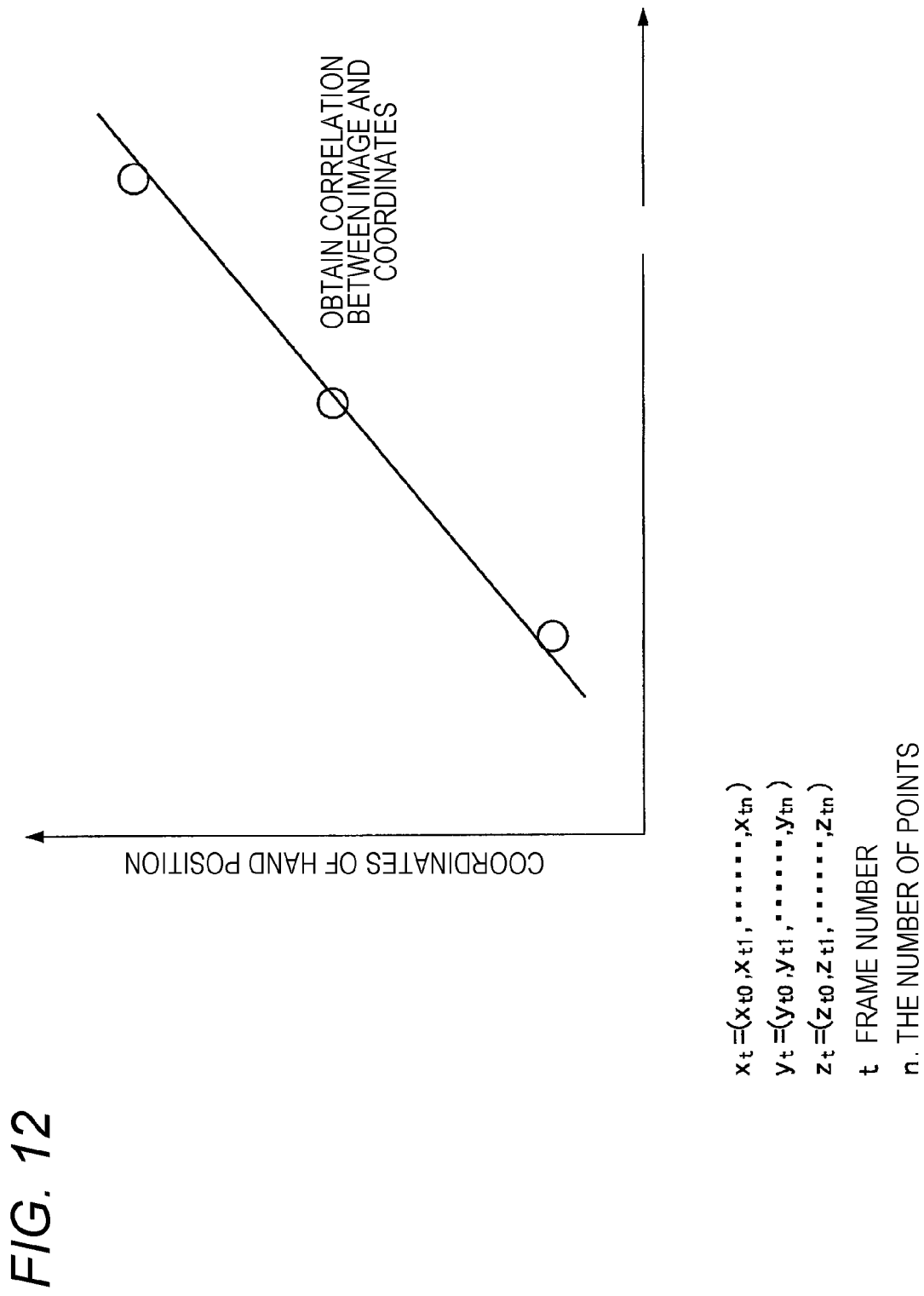
FIG. 12 is a diagram for describing an example of the three-dimensional position estimation method.

The three-dimensional position estimation unit 121 learns the coordinates of the feature points on the hand with respect to the input images by using a predetermined algorithm, and can thus obtain a correlation between an input image and the coordinates of each point on the hand as illustrated in FIG. 12. As the algorithm, the above-mentioned CNN, boosting, support vector machine (SVM), graph cut, or the like can be applied. Note that, in the example illustrated in FIG. 12, a linear correlation is shown as an example of the correlation between an input image and the coordinates of each point on the hand. However, the correlation between an input image and the coordinates of each point on the hand may be another correlation (e.g., non-linear).

Figure 13:
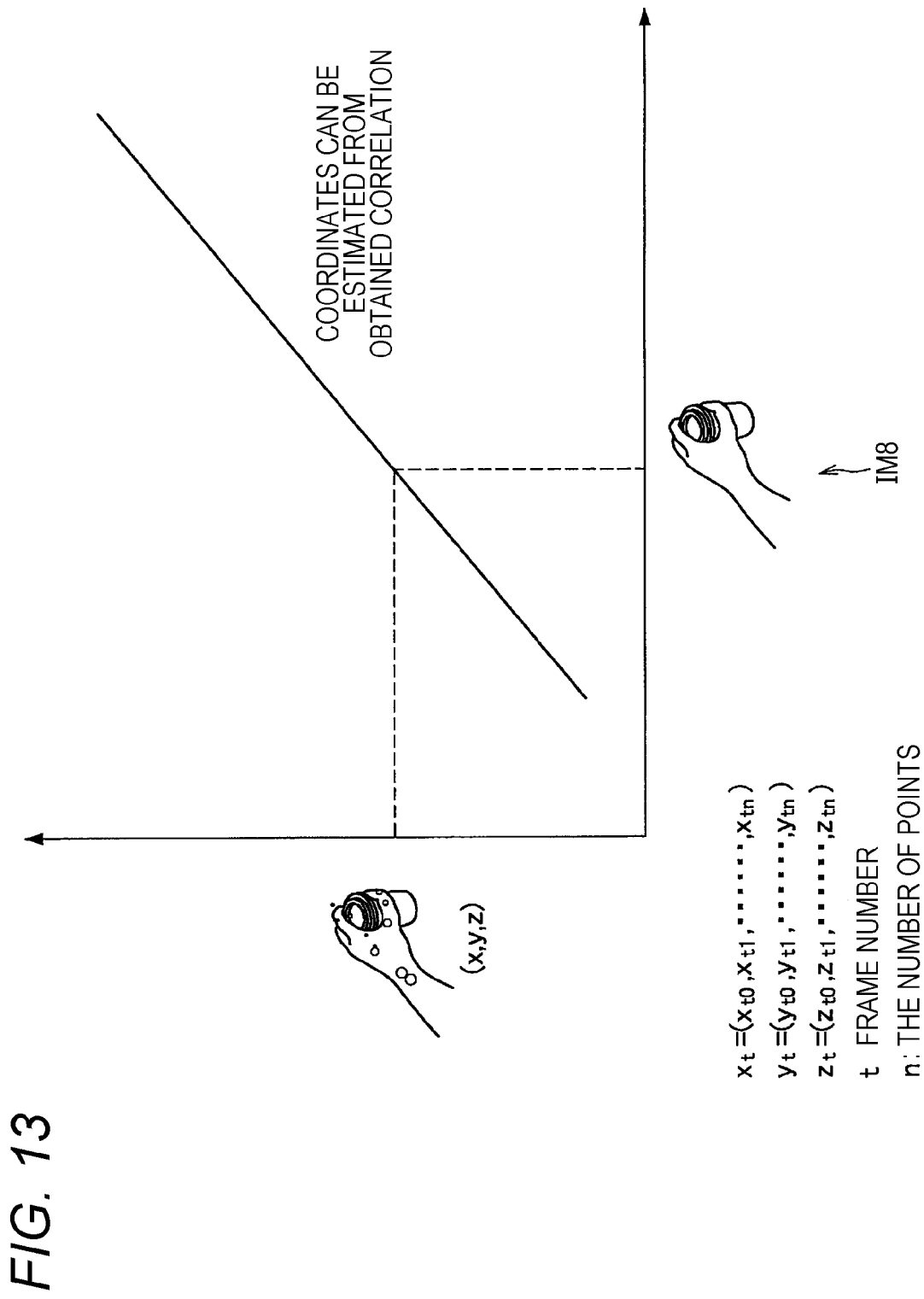
FIG. 13 is a diagram for describing an example of the three-dimensional position estimation method.

In a case where an image IM8 is input as illustrated in FIG. 13 after the correlation between an input image and the coordinates of each point on the hand has been obtained, the three-dimensional position estimation unit 121 can estimate the coordinate position of the hand in the image IM8 on the basis of the correlation. The three-dimensional position estimation method described above may be used by the three-dimensional position estimation unit 121 to estimate the position of each point on the hand. Note that a case has been assumed here in which coordinates of feature points of a hand with respect to input images are learned. Alternatively, in a case where feature amounts are extracted from input images before learning, the coordinates of the feature points of the hand with respect to the feature amounts may be learned.

Returning to FIG. 2, the description will be continued. The three-dimensional position estimation unit 121 causes the storage unit 128 to store estimated three-dimensional position information of each point on the operation body (in the above, the three-dimensional position information of each point on the user's hand). The frame count determination unit 122 determines whether three-dimensional position information corresponding to a predetermined number of frames has been obtained by the three-dimensional position estimation unit 121 (that is, whether three-dimensional position information corresponding to the predetermined number of frames has been stored in the storage unit 128). The predetermined number of frames is not particularly limited, and is only required to be two or more.

In a case where the frame count determination unit 122 determines that three-dimensional position information corresponding to the predetermined number of frames has been obtained, the relative velocity/relative position calculation unit 123 calculates an absolute position of each point on the operation body on the basis of the three-dimensional position information of each point on the operation body stored by the storage unit 128. Then, the relative velocity/relative position calculation unit 123 calculates a relative position of an operation point of the operation body with respect to a reference point of the operation body on the basis of the absolute position of each point on the operation body. Note that the present specification mainly assumes a case where the relative position is a three-dimensional vector. However, the relative position may be a two-dimensional vector or a scalar.

Alternatively, the relative velocity/relative position calculation unit 123 calculates an absolute velocity of each point on the basis of a change in the time direction of the three-dimensional position of each point on the operation body. Then, the relative velocity/relative position calculation unit 123 calculates a relative velocity of the operation point of the operation body with respect to the reference point of the operation body on the basis of the absolute velocity of each point. Specifically, when the relative velocity of the operation point is expressed as "V (relative velocity of operation point)", the absolute velocity of the operation point is expressed as "V (absolute velocity of operation point)", and the absolute velocity of the reference point is expressed as "V (absolute velocity of reference point)", V (relative velocity of operation point) can be calculated on the basis of V (absolute velocity of operation point) and V (absolute velocity of reference point) as represented by the following equation (1).

$$V(\text{relative velocity of operation point}) = V(\text{absolute velocity of operation point}) - V(\text{absolute velocity of reference point}) \quad (1)$$

Note that the present specification mainly assumes a case where the relative velocity is a three-dimensional vector. However, the relative position may be a two-dimensional vector or a scalar. The gesture recognition unit 124 recognizes a gesture of the operation body on the basis of the relative position or relative velocity of the operation point with respect to the reference point of the operation body calculated by the relative velocity/relative position calculation unit 123. This makes it possible to recognize a gesture made by an operation body with higher accuracy.

More specifically, the gesture recognition unit 124 recognizes a first gesture in a case where the relative position or relative velocity of the operation point with respect to the reference point exceeds a threshold value. On the other hand, the gesture recognition unit 124 recognizes a second gesture different from the first gesture in a case where the relative position or relative velocity of the operation point with respect to the reference point is equal to or less than the threshold value. Note that, in a case where the relative position or relative velocity of the operation point with respect to the reference point is equal to the threshold value, the first gesture may be recognized. Furthermore, in a case where the relative position or relative velocity is a vector (two-dimensional vector or three-dimensional vector), the relative position or relative velocity to be compared with the threshold value is only required to be replaced with the length of the vector.

Figure 14:
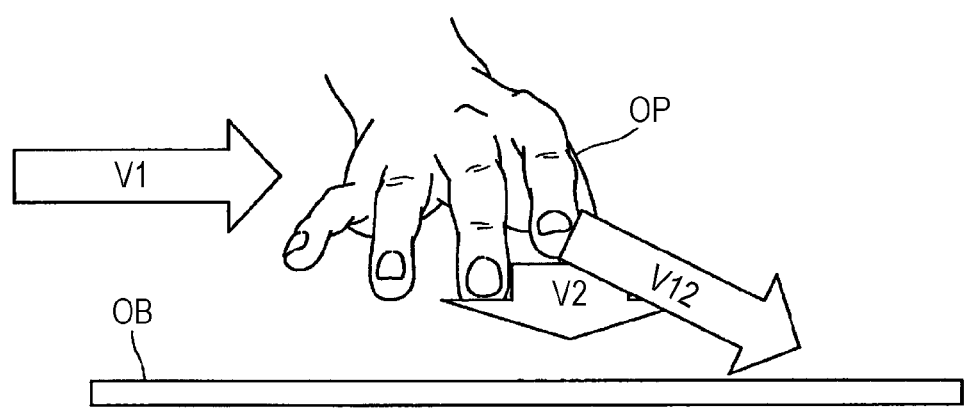
FIG. 14 is a diagram for describing gesture recognition according to the first embodiment of the present disclosure.

FIG. 14 is a diagram for describing gesture recognition according to the first embodiment of the present disclosure. In the example illustrated in FIG. 14, in a similar manner to the example illustrated in FIG. 1, a case is assumed in which a user, who is trying to perform a key input, moves a fingertip downward at a relative velocity V2 of the fingertip with respect to a palm to perform the key input while moving the palm toward the right of a paper surface at an absolute velocity V1 in order to change the key to be used for the key input. At this time, in a similar manner to the example illustrated in FIG. 1, an absolute velocity V12 of the fingertip is a velocity obtained by combining the absolute velocity V1 of the palm and the relative velocity V2 of the fingertip with respect to the palm. However, in the gesture recognition according to the first embodiment of the present disclosure, a velocity component due to a change of the key to be used for a key input is excluded when a determination on whether or not a key input has been performed, and this makes it possible to recognize a key input (a gesture made by the operation body) with high accuracy.

Note that the following mainly assumes a case where the gesture recognition unit 124 recognizes a gesture of the operation body on the basis of the relative velocity of the operation point with respect to the reference point of the operation body. However, the gesture recognition unit 124 is only required to recognize a gesture of the operation body on the basis of at least one of the relative position or the relative velocity of the operation point with respect to the reference point of the operation body.

The command execution unit 125 can function as a command determination unit that determines a command corresponding to a gesture recognized by the gesture recognition unit 124. Furthermore, the command execution unit 125 executes the determined command. Here, the type of command executed by the command execution unit 125 is not limited. For example, the type of command executed by the command execution unit 125 may be appropriately changed in accordance with an application executed by the information processing apparatus 140.

The configuration example of the information processing apparatus 140 according to the first embodiment of the present disclosure has been described above.

1.3. Operation Example of Information Processing System

Figure 15:
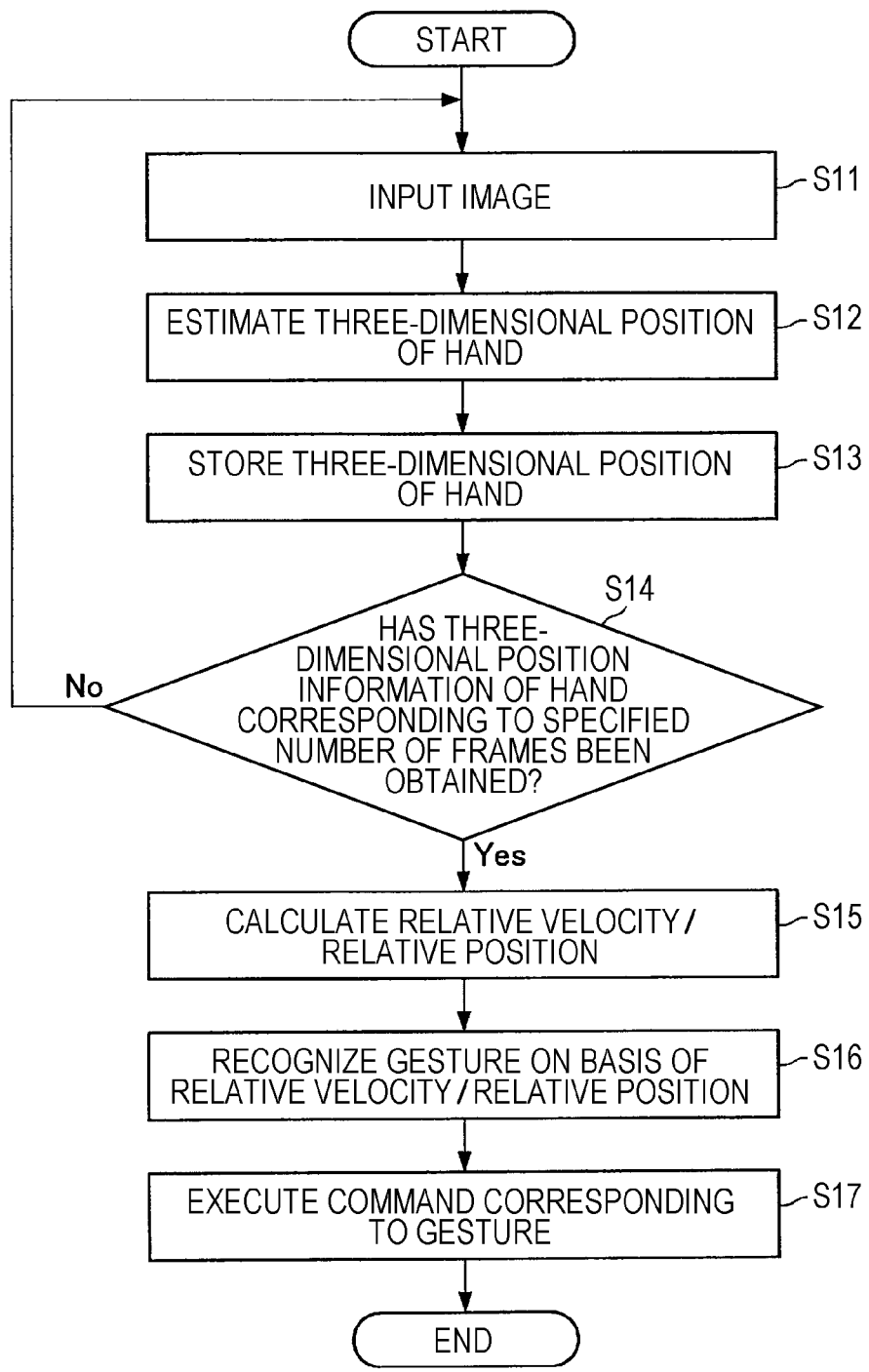
FIG. 15 is a flowchart illustrating an operation example of the information processing system according to the same embodiment.

Next, an operation example of the information processing system 100 according to the first embodiment of the present disclosure will be described. FIG. 15 is a flowchart illustrating the operation example of the information processing system 100 according to the first embodiment of the present disclosure. The input unit 120 inputs (acquires) an image by sensing a user's hand as an example of the operation body in chronological order (S11). The three-dimensional position estimation unit 121 estimates three-dimensional positions of points on the hand on the basis of the image obtained by the input unit 120 (S12). Note that the points whose three-dimensional positions are to be estimated by the three-dimensional position estimation unit 121 are not limited to the points on the user's hand as described above.

Next, the three-dimensional position estimation unit 121 stores the three-dimensional position of the hand in the storage unit 128 (S13). The frame count determination unit 122 determines whether three-dimensional position information corresponding to a specified number of frames (predetermined number of frames) has been obtained by the three-dimensional position estimation unit 121 (S14). In a case where three-dimensional position information corresponding to the specified number of frames (predetermined number of frames) has not been obtained by the three-dimensional position estimation unit 121 ("No" in S14), the frame count determination unit 122 returns to S11. On the other hand, in a case where three-dimensional position information corresponding to the specified number of frames (predetermined number of frames) has been obtained by the three-dimensional position estimation unit 121 ("Yes" in S14), the frame count determination unit 122 shifts the operation to S15.

The relative velocity/relative position calculation unit 123 calculates the absolute position of each point on the hand on the basis of the three-dimensional position information of each point on the hand stored by the storage unit 128. Then, the relative velocity/relative position calculation unit 123 calculates the relative position of the operation point of the hand with respect to the reference point of the hand on the basis of the absolute position of each point on the hand. Alternatively, the relative velocity/relative position calculation unit 123 calculates the absolute velocity of each point on the basis of a change in the time direction of the three-dimensional position of each point on the hand. Then, the relative velocity/relative position calculation unit 123 calculates the relative velocity of the operation point of the hand with respect to the reference point of the hand on the basis of the absolute velocity of each point (S15).

Next, the gesture recognition unit 124 recognizes a gesture of the hand on the basis of the relative position or relative velocity of the operation point with respect to the reference point of the operation body calculated by the relative velocity/relative position calculation unit 123 (S16). This makes it possible to recognize a gesture made by a hand with higher accuracy. More specifically, the gesture recognition unit 124 recognizes a first gesture in a case where the relative position or relative velocity of the operation point with respect to the reference point exceeds the threshold value. On the other hand, the gesture recognition unit 124 recognizes a second gesture different from the first gesture in a case where the relative position or relative velocity of the operation point with respect to the reference point is equal to or less than the threshold value. Note that, in a case where the relative position or relative velocity of the operation point with respect to the reference point of the operation body is equal to the threshold value, the first gesture may be recognized.

Next, the command execution unit 125 determines a command corresponding to the gesture recognized by the gesture recognition unit 124. Then, the command execution unit 125 executes the command corresponding to the gesture recognized by the gesture recognition unit 124 (S17). As described above, the type of command executed by the command execution unit 125 may be appropriately changed in accordance with an application executed by the information processing apparatus 140.

The operation example of the information processing system 100 according to the first embodiment of the present disclosure has been described above.

2. Second Embodiment

2.1. Configuration Example of Information Processing System

Figure 16:
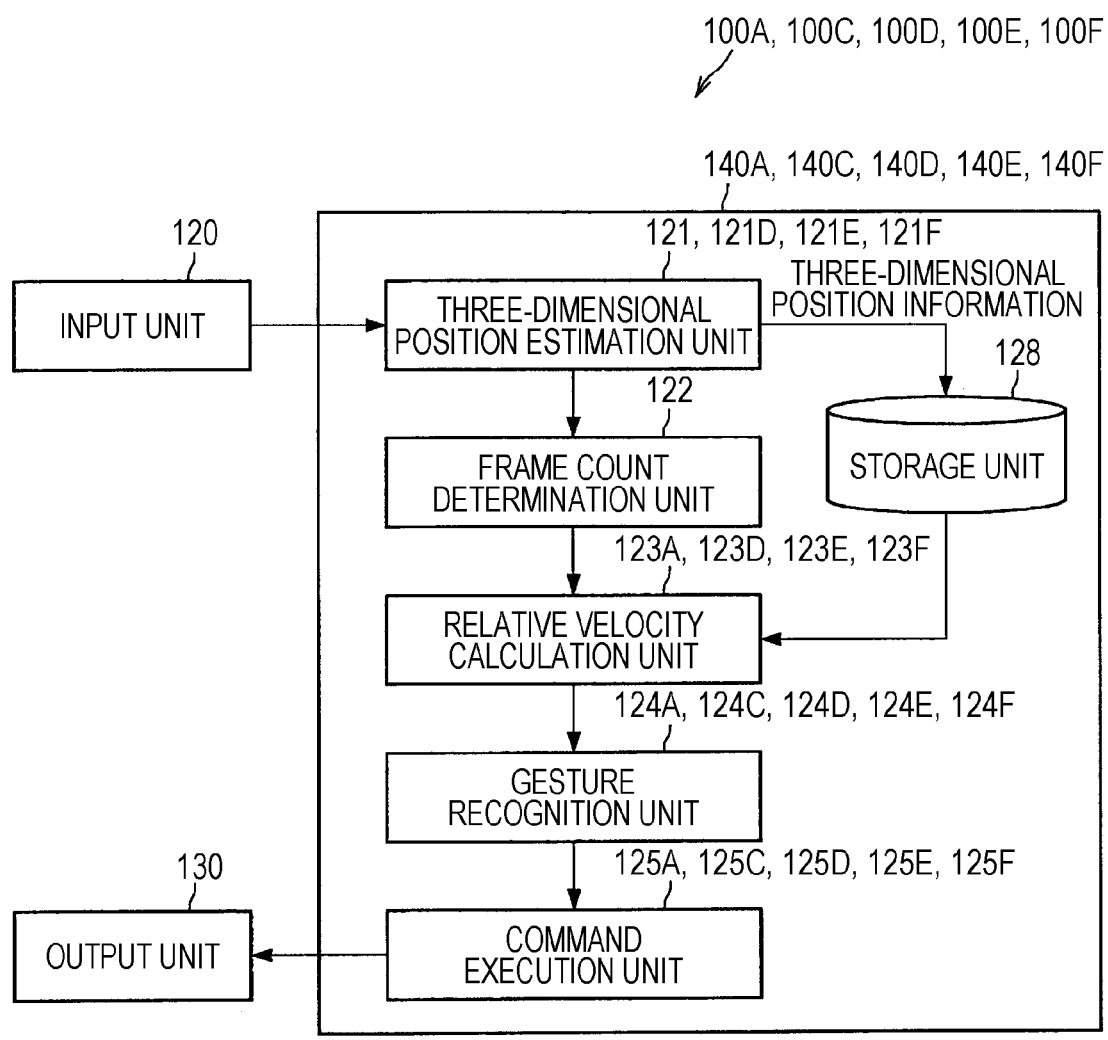
FIG. 16 is a diagram illustrating a functional configuration example of an information processing system according to second and fourth to seventh embodiments of the present disclosure.

Next, a configuration example of an information processing system according to a second embodiment of the present disclosure will be described. FIG. 16 is a diagram illustrating a functional configuration example of the information processing system according to the second embodiment and fourth to seventh embodiments of the present disclosure.

As illustrated in FIG. 16, an information processing apparatus 140A of an information processing system 100A according to the second embodiment of the present disclosure differs from the information processing apparatus 140 of the information processing system 100 according to the first embodiment of the present disclosure in that a relative velocity calculation unit 123A, a gesture recognition unit 124A, and a command execution unit 125A are included in place of the relative position/relative velocity calculation unit 123, the gesture recognition unit 124, and the command execution unit 125. Therefore, in the following description, the relative velocity calculation unit 123A, the gesture recognition unit 124A, and the command execution unit 125A will be mainly described, and detailed description of other configurations included in the information processing system 100A according to the second embodiment of the present disclosure will be omitted.

Figure 17:
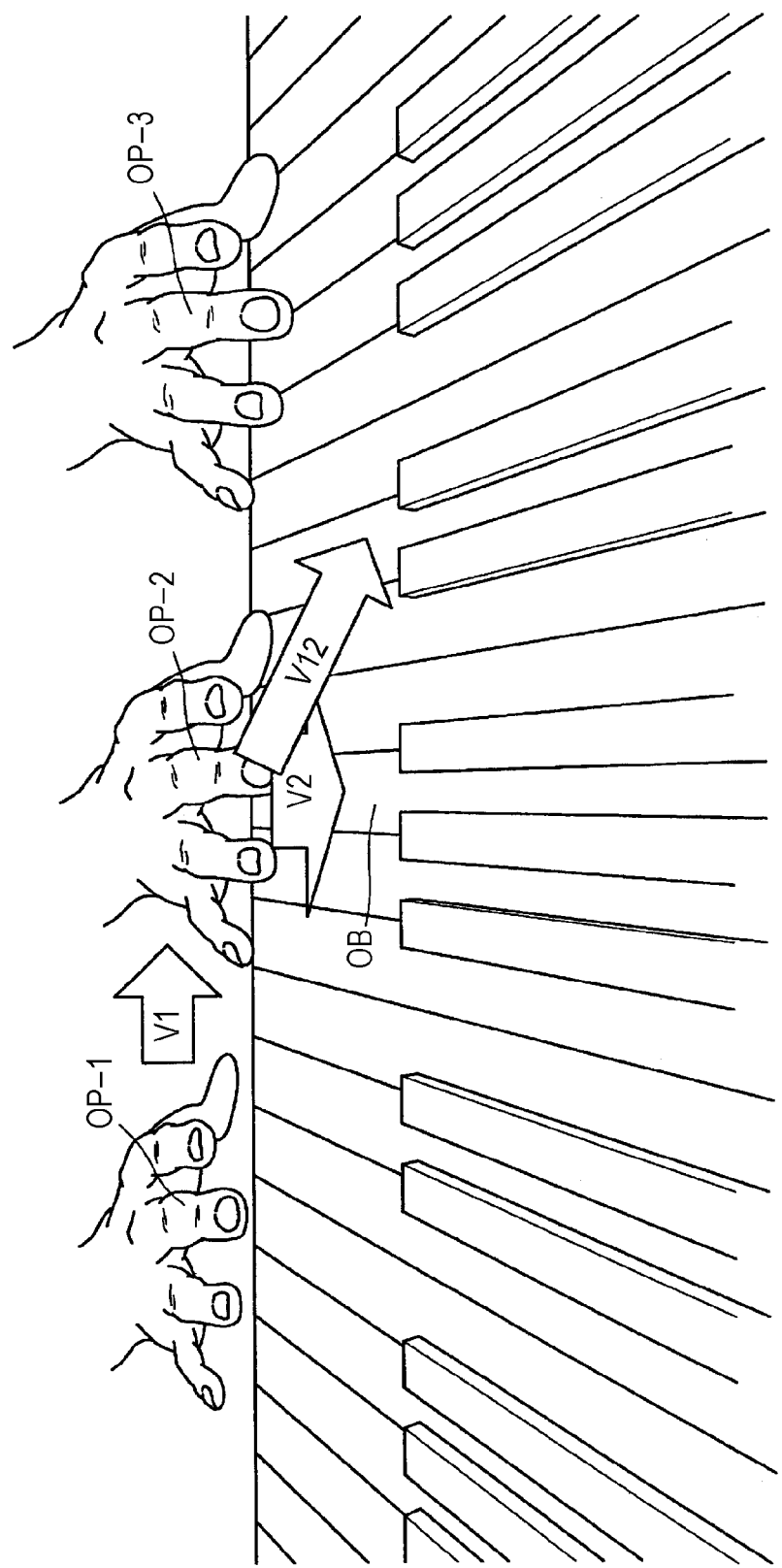
FIG. 17 is a diagram for describing a function of the information processing system according to the same embodiment.

FIG. 17 is a diagram for describing a function of the information processing system 100A according to the second embodiment of the present disclosure. As illustrated in FIG. 17, in the second embodiment of the present disclosure, a case is assumed in which the information processing apparatus 140A executes an application for outputting a piano sound on the basis of an operation by a user. That is, in the second embodiment of the present disclosure, a case is assumed in which an operation body OP is a user's hand, and an object OB is a piano keyboard. However, as described above, the operation body OP is not limited to a user's hand.

Furthermore, here, a case is assumed in which the object OB is a virtual object displayed by an output unit 130. However, the object OB is not limited to a virtual object but may be a real object. Moreover, here, a case is assumed in which a reference point of the operation body OP is a predetermined point on the palm (here, the position of the center of the hand), and an operation point of the operation body OP is a fingertip. However, as described above, the position of the center of the hand is not limited to a specific position.

In a case where a frame count determination unit 122 determines that three-dimensional position information corresponding to a predetermined number of frames has been obtained, the relative velocity calculation unit 123A calculates the relative velocity of the operation point of the operation body with respect to the reference point of the operation body on the basis of the absolute velocity of each point on the operation body. Here, a case is assumed in which the relative velocity calculation unit 123A calculates a relative velocity of the fingertip with respect to the center of the hand. That is, in the second embodiment of the present disclosure, it is sufficient if the three-dimensional position of each of the center of the hand and the fingertip is estimated by a three-dimensional position estimation unit 121.

The gesture recognition unit 124A recognizes a gesture of the operation body on the basis of the relative velocity of the operation point with respect to the reference point calculated by the relative velocity calculation unit 123A. Here, in a case where the relative velocity of the fingertip with respect to the center of the hand exceeds a threshold value, the gesture recognition unit 124A recognizes a touch with the fingertip on the object OB as a first gesture. For example, in a case where the relative velocity of the fingertip with respect to the center of the hand in a predetermined direction (e.g., downward) exceeds the threshold value, the gesture recognition unit 124A recognizes a touch with the fingertip on the object OB (here, a key input) as a first gesture. On the other hand, in a case where the relative velocity of the fingertip with respect to the center of the hand is equal to or less than the threshold value, the gesture recognition unit 124A recognizes non-touch with the fingertip on the object OB as a second gesture.

In the example illustrated in FIG. 17, in a similar manner to the example illustrated in FIG. 1, a case is assumed in which a user, who is trying to perform a key input, moves a fingertip downward at a relative velocity V2 of the fingertip with respect to a palm to perform the key input while moving the palm toward the right of a paper surface at an absolute velocity V1 (operation bodies OP-1 to OP-3) in order to change the key to be used for the key input. At this time, in a similar manner to the example illustrated in FIG. 1, an absolute velocity V12 of the fingertip is a velocity obtained by combining the absolute velocity V1 of the palm and the relative velocity V2 of the fingertip with respect to the palm. However, in the gesture recognition according to the second embodiment of the present disclosure, a velocity component due to a change of the key to be used for a key input is excluded when a determination on whether or not a key input has been performed, and this makes it possible to recognize a key input with high accuracy.

The command execution unit 125A executes a command corresponding to the gesture recognized by the gesture recognition unit 124A. Here, the type of command executed by the command execution unit 125A is not limited. Here, a command corresponding to a touch with a fingertip on an object OB may include a command to output a sound corresponding to the object OB touched by the fingertip. That is, in a case where a touch with the fingertip on the object OB has been recognized, the command execution unit 125A may execute a command to cause the output unit 130 to output a sound corresponding to the object OB touched by the fingertip.

The command execution unit 125A may output a sound with always the same volume in a case where the relative velocity of the fingertip in the predetermined direction with respect to the center of the hand exceeds the threshold value. Alternatively, the command execution unit 125A may adjust the volume (e.g., the volume of the first sound) in accordance with the relative velocity of the fingertip in the predetermined direction with respect to the center of the hand. For example, in a case where the relative velocity of the fingertip in the predetermined direction with respect to the center of the hand exceeds the threshold value, the command execution unit 125A may increase the volume as the relative velocity of the fingertip in the predetermined direction with respect to the center of the hand increases. This makes it possible to adjust the volume in accordance with a movement of a user who touches the object OB more strongly when the user wants to output a louder sound.

Here, the relationship between the relative velocity of the fingertip in the predetermined direction with respect to the center of the hand and the volume may be constant, or may be appropriately changed. For example, the relationship between the volume and the relative velocity of the fingertip in the predetermined direction with respect to the center of the hand may be changed by an application setting, or may be changed by learning for each person. For example, the relationship between the volume and the relative velocity of the fingertip in the predetermined direction with respect to the center of the hand may be determined so that the lower the relative velocity on average of a user, the higher the volume on average.

Furthermore, the threshold value to be compared with the relative velocity of the fingertip in the predetermined direction with respect to the center of the hand may be constant, or may be appropriately changed. For example, the threshold value to be compared with the relative velocity of the fingertip in the predetermined direction with respect to the center of the hand may be changed by an application setting, or may be changed by learning for each person. For example, the threshold value may be determined so that the lower the relative velocity on average of a user, the smaller the threshold value.

The configuration example of the information processing system 100A according to the second embodiment of the present disclosure has been described above.

2.2. Operation Example of Information Processing System

Figure 18:
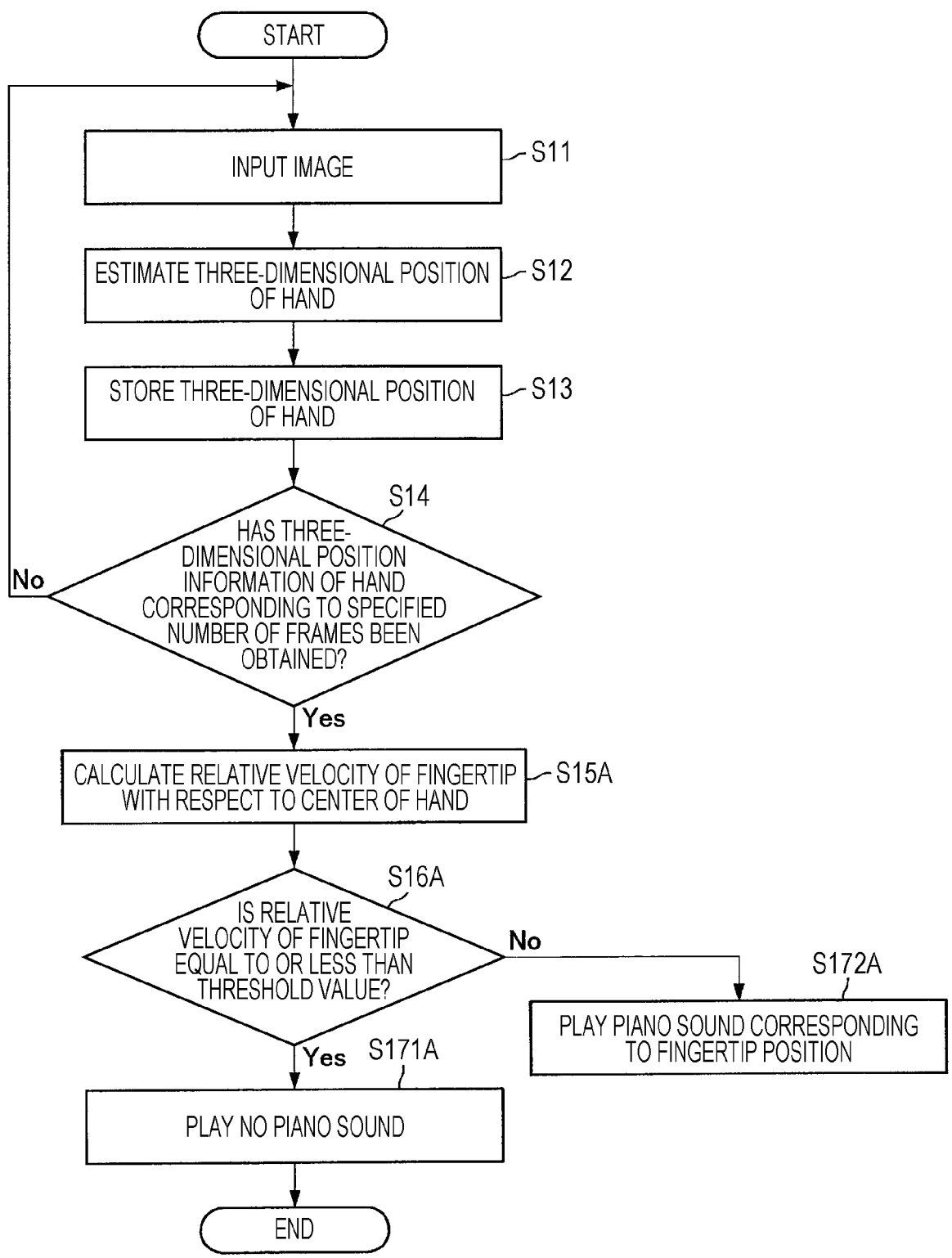
FIG. 18 is a flowchart illustrating an operation example of the information processing system according to the same embodiment.

Next, an operation example of the information processing system 100A according to the second embodiment of the present disclosure will be described. FIG. 18 is a flowchart illustrating the operation example of the information processing system 100A according to the second embodiment of the present disclosure. S11 to S14 illustrated in FIG. 18 may be executed in a similar manner to those in the operation example (S11 to S14 illustrated in FIG. 15) of the information processing system 100 according to the first embodiment of the present disclosure. However, in the second embodiment of the present disclosure, the three-dimensional position estimation unit 121 is only required to estimate the three-dimensional position of each of the center of the hand and the fingertip.

The relative velocity calculation unit 123A calculates the absolute velocity of each point on the basis of a change in the time direction of the three-dimensional position of each point on the hand. Then, the relative velocity calculation unit 123A calculates the relative velocity of the operation point of the hand with respect to the reference point of the hand on the basis of the absolute velocity of each point. In the second embodiment of the present disclosure, the relative velocity calculation unit 123A calculates the relative velocity of the fingertip with respect to the center of the hand on the basis of the absolute velocity of the center of the hand and the absolute velocity of the fingertip (S15A).

Next, the gesture recognition unit 124A recognizes a gesture of the operation body on the basis of the relative velocity of the operation point with respect to the reference point of the operation body calculated by the relative velocity calculation unit 123A. More specifically, in a case where the relative velocity of the fingertip with respect to the center of the hand exceeds the threshold value ("No" in S16A), the gesture recognition unit 124A recognizes a touch on the object OB as an example of a first gesture, and shifts the operation to S172A. On the other hand, in a case where the relative velocity of the fingertip with respect to the center of the hand is equal to or less than the threshold value ("Yes" in S16A), the gesture recognition unit 124A recognizes non-touch on the object OB as an example of a second gesture different from the first gesture, and shifts the operation to S171A. Note that, in a case where the relative velocity of the fingertip with respect to the center of the hand is equal to the threshold value, the first gesture may be recognized.

Next, the command execution unit 125A executes a command corresponding to the gesture recognized by the gesture recognition unit 124A. In a case where the gesture recognition unit 124A has recognized a touch on the object OB, the command execution unit 125A executes a command to play (output) a piano sound (a piano sound corresponding to the key at the position of the fingertip) in accordance with the position of the fingertip (S172A). On the other hand, in a case where the gesture recognition unit 124A has recognized non-touch on the object OB, the command execution unit 125A does not play (does not output) a piano sound (S171A).

The operation example of the information processing system 100A according to the second embodiment of the present disclosure has been described above.

3. Third Embodiment

3.1. Configuration Example of Information Processing System

Figure 19:
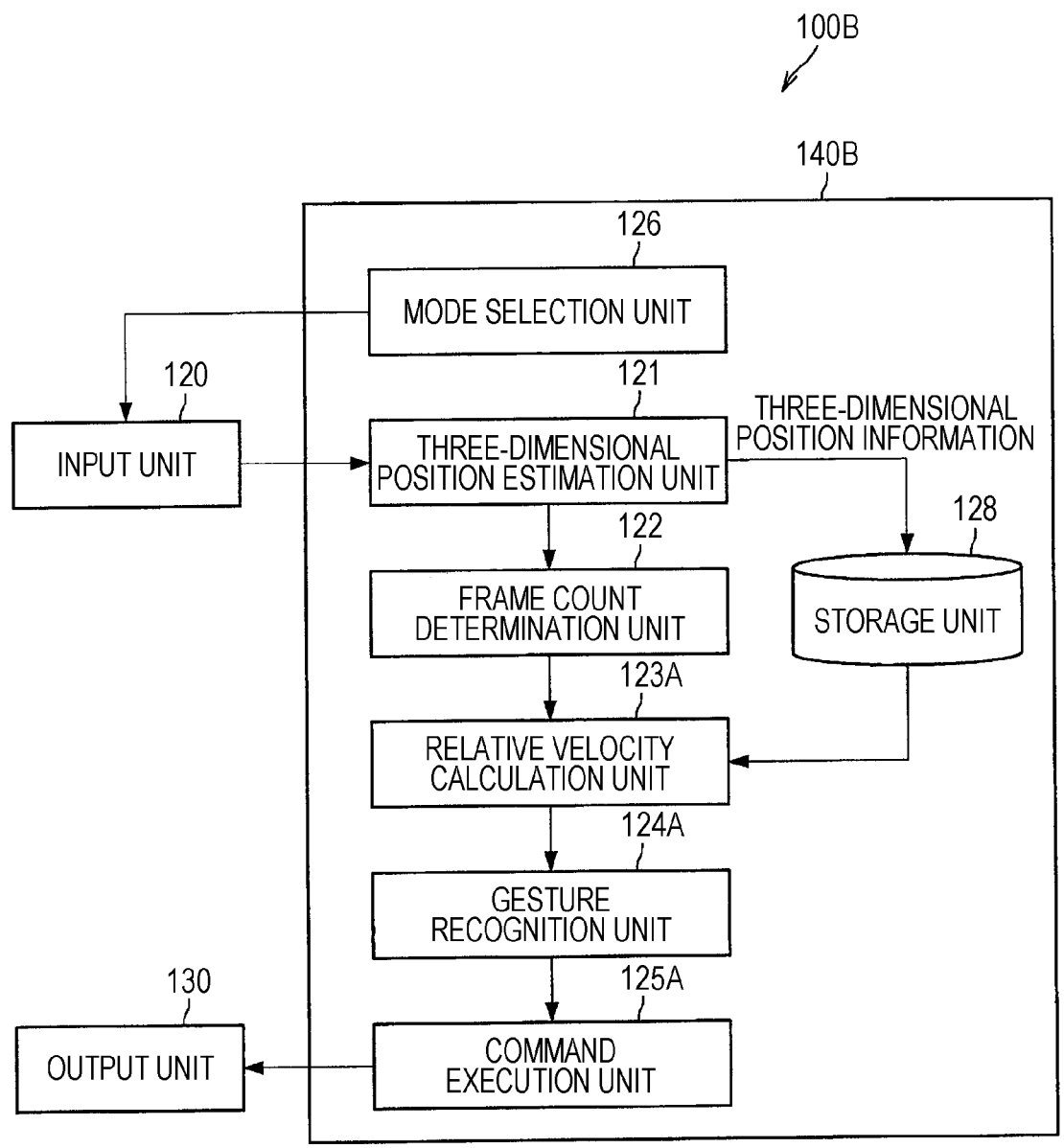
FIG. 19 is a diagram illustrating a functional configuration example of an information processing system according to a third embodiment of the present disclosure.

Next, a configuration example of an information processing system according to a third embodiment of the present disclosure will be described. FIG. 19 is a diagram illustrating a functional configuration example of the information processing system according to the third embodiment of the present disclosure.

As illustrated in FIG. 19, an information processing apparatus 140B of an information processing system 100B according to the third embodiment of the present disclosure differs from the information processing apparatus 140 of the information processing system 100A according to the second embodiment of the present disclosure in that a mode selection unit 126 is included. Therefore, in the following description, the mode selection unit 126 will be mainly described, and detailed description of other configurations included in the information processing system 100B according to the third embodiment of the present disclosure will be omitted.

In the third embodiment of the present disclosure, the mode selection unit 126 selects a mode. Here, the mode may be used to determine the relative position calculation method, or may be determined for each application. Alternatively, one of a plurality of modes that differ from each other in one application may be selected.

A relative velocity calculation unit 123A calculates a relative velocity in accordance with the mode on the basis of an image obtained by an input unit 120. As a result, a relative velocity in accordance with the mode is calculated. Specifically, the mode selection unit 126 may determine a reference point and an operation point in accordance with the mode. For example, the mode selection unit 126 may determine the center of the hand as the reference point and the fingertip as the operation point in a case where an application for outputting a piano sound is executed on the basis of an operation by a user.

A gesture recognition unit 124A recognizes a gesture in accordance with the mode on the basis of the relative velocity calculated by the relative velocity calculation unit 123A. As a result, the gesture in accordance with the mode is recognized. A command execution unit 125A executes a command in accordance with the mode on the basis of the gesture recognized by the gesture recognition unit 124A. As a result, the command in accordance with the mode is executed. Note that the above mainly assumes a case where a relative velocity in accordance with a mode is calculated. However, the method of calculating the relative velocity may be determined on the basis of other pieces of information.

The configuration example of the information processing system 100A according to the third embodiment of the present disclosure has been described above.

3.2. Operation Example of Information Processing System

Figure 20:
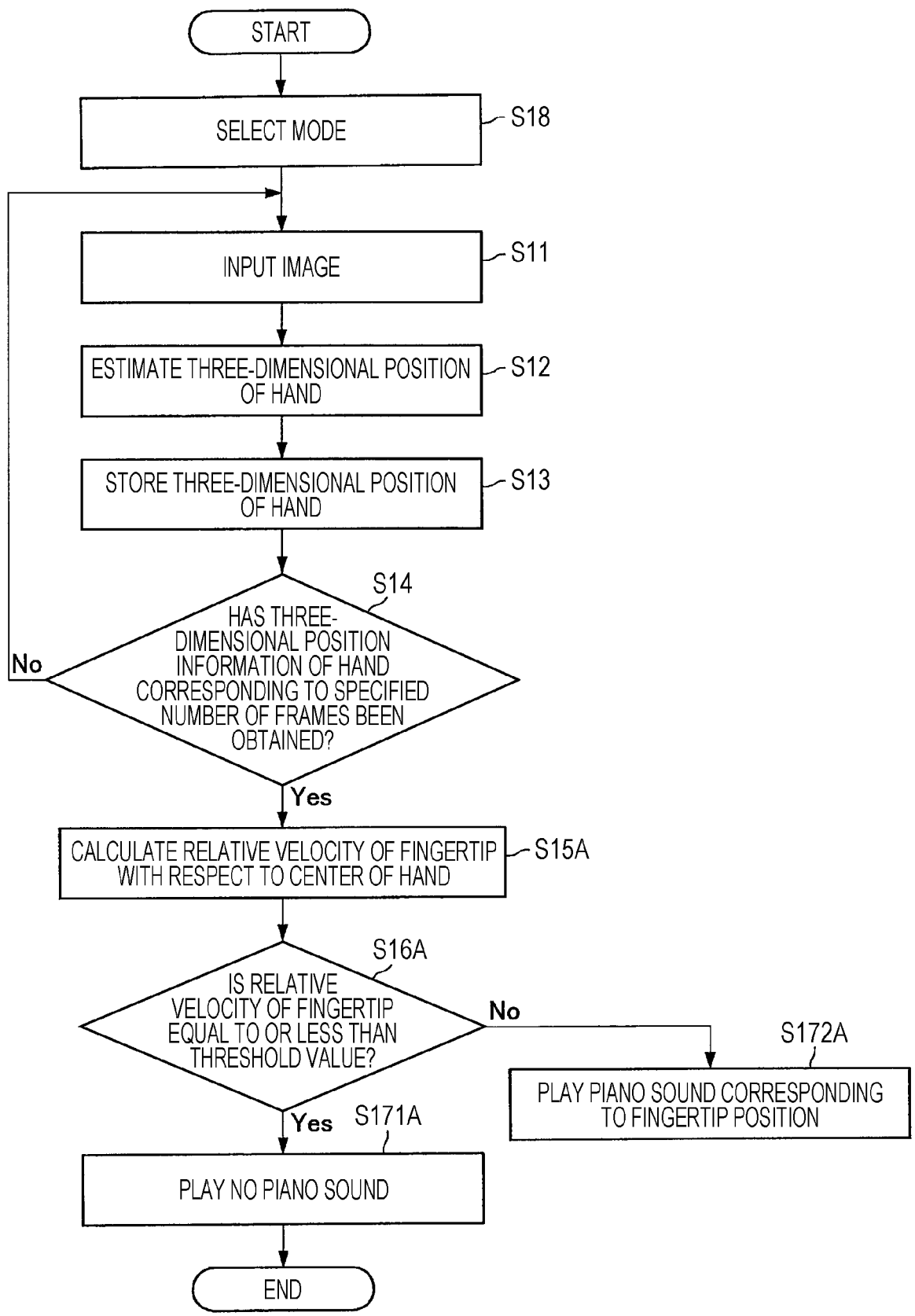
FIG. 20 is a flowchart illustrating an operation example of the information processing system according to the same embodiment.

Next, an operation example of the information processing system 100B according to the third embodiment of the present disclosure will be described. FIG. 20 is a flowchart illustrating the operation example of the information processing system 100B according to the third embodiment of the present disclosure. The mode selection unit 126 selects a mode to be used to determine the relative position calculation method (S18). For example, the mode selection unit 126 sets a reference point and an operation point corresponding to the mode. Here, a case is assumed in which the center of the hand is set as the reference point and the fingertip is set as the operation point. S11 and later may be executed in a similar manner to the operation example (S11 and later illustrated in FIG. 18) of the information processing system 100A according to the second embodiment of the present disclosure.

The operation example of the information processing system 100B according to the third embodiment of the present disclosure has been described above.

4. Fourth Embodiment

4.1. Configuration Example of Information Processing System

Next, a configuration example of an information processing system according to a fourth embodiment of the present disclosure will be described.

As illustrated in FIG. 16, an information processing apparatus 140C of an information processing system 100C according to the fourth embodiment of the present disclosure differs from the information processing apparatus 140A of the information processing system 100A according to the second embodiment of the present disclosure in that a gesture recognition unit 124C and a command execution unit 125C are included in place of the gesture recognition unit 124A and the command execution unit 125A. Therefore, in the following description, the gesture recognition unit 124C and the command execution unit 125C will be mainly described, and detailed description of other configurations included in the information processing system 100C according to the fourth embodiment of the present disclosure will be omitted.

Figure 21:
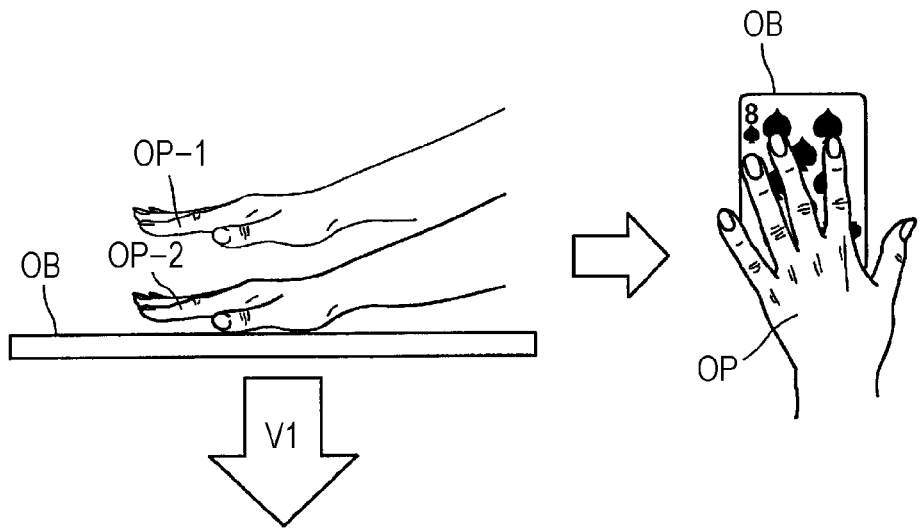
FIG. 21 is a diagram for describing a function of the information processing system according to the same embodiment.
Figure 22:
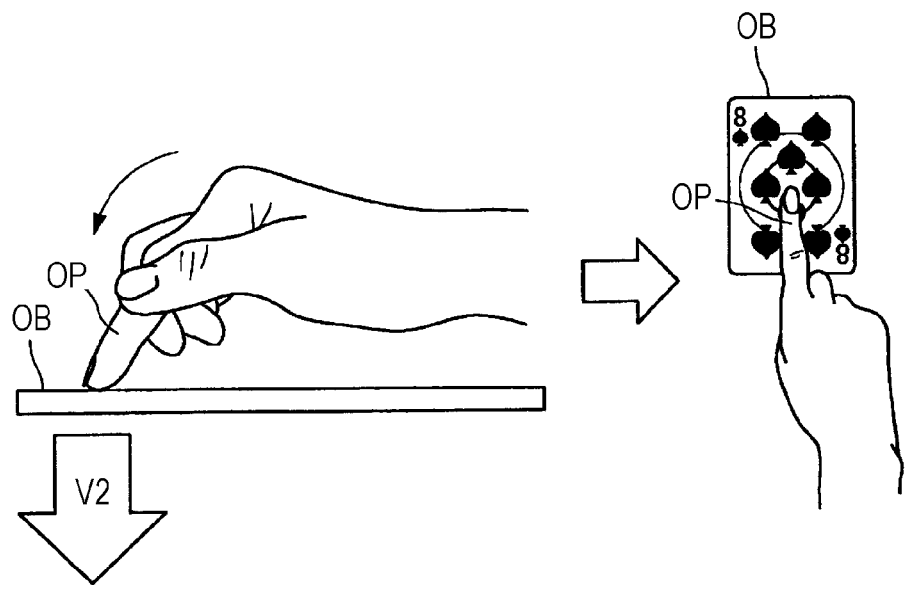
FIG. 22 is a diagram for describing a function of the information processing system according to the same embodiment.

FIGS. 21 and 22 are diagrams for describing a function of the information processing system 100C according to the fourth embodiment of the present disclosure. As illustrated in FIGS. 21 and 22, in the fourth embodiment of the present disclosure, a case is assumed in which the information processing apparatus 140C executes a game application on the basis of an operation by a user. That is, in the fourth embodiment of the present disclosure, a case is assumed in which an operation body OP is a user's hand. However, as described above, the operation body OP is not limited to a user's hand.

Furthermore, here, a case is assumed in which an object OB is a virtual object displayed by an output unit 130. However, the object OB is not limited to a virtual object but may be a real object. Moreover, here, a case is assumed in which a reference point of the operation body OP is a predetermined point on the palm (here, the position of the center of the hand), and an operation point of the operation body OP is a fingertip. However, as described above, the position of the center of the hand is not limited to a specific position.

The gesture recognition unit 124C recognizes a gesture of the operation body on the basis of the relative velocity of the operation point with respect to the reference point calculated by a relative velocity calculation unit 123A. Here, in a case where the relative velocity of the fingertip with respect to the center of the hand exceeds a threshold value, the gesture recognition unit 124 recognizes a touch with the fingertip on the object OB as a first gesture. For example, in a case where the relative velocity of the fingertip with respect to the center of the hand exceeds the threshold value, the gesture recognition unit 124C recognizes a touch with the fingertip on the object OB as a first gesture. On the other hand, in a case where the relative velocity of the fingertip with respect to the center of the hand is equal to or less than the threshold value, the gesture recognition unit 124C recognizes a touch with the hand (or palm) on the object OB as a second gesture.

In the example illustrated in FIG. 21, a case is assumed in which the palm is moved downward at an absolute velocity V1 for the purpose of moving an object OB (operation bodies OP-1 to OP-2). At this time, a relative velocity V2 of the fingertip with respect to the palm has a relatively small value. On the other hand, in the example illustrated in FIG. 22, a case is assumed in which the fingertip is moved downward at the relative velocity V2 for the purpose of selecting an object OB (operation body OP). At this time, the relative velocity V2 of the fingertip with respect to the palm has a relatively large value. In the gesture recognition according to the fourth embodiment of the present disclosure, since a gesture with respect to an object is determined on the basis of the relative velocity V2 of the fingertip with respect to the palm, it is possible to recognize the gesture with high accuracy.

The command execution unit 125C executes a command corresponding to the gesture recognized by the gesture recognition unit 124C. Here, the type of command executed by the command execution unit 125 is not limited. For example, a command corresponding to a touch with a fingertip on an object OB may include a command to select the object OB touched by the fingertip. That is, in a case where a touch with the fingertip on the object OB has been recognized, the command execution unit 125 may execute a command to select the object OB touched by the fingertip.

On the other hand, a command corresponding to a touch with a hand (or palm) on an object OB may include a command to move the object OB touched by the hand (or palm). That is, in a case where a touch with the hand (or palm) on the object OB has been recognized, the command execution unit 125 may execute a command to move the object OB touched by the hand (or palm).

Note that the fourth embodiment of the present disclosure may be combined with the third embodiment of the present disclosure. That is, the information processing apparatus 140C according to the fourth embodiment of the present disclosure may include a mode selection unit 126. In such a case, the relative velocity calculation unit 123A calculates a relative velocity in accordance with a mode on the basis of an image obtained by an input unit 120. As a result, a relative velocity in accordance with the mode is calculated. Specifically, the mode selection unit 126 may determine a reference point and an operation point in accordance with the mode. For example, in a case where a game application is executed on the basis of an operation by a user, the mode selection unit 126 may determine the center of the hand as the reference point and the fingertip as the operation point.

The gesture recognition unit 124C recognizes a gesture in accordance with the mode on the basis of the relative velocity calculated by the relative velocity calculation unit 123A. As a result, the gesture in accordance with the mode is recognized. The command execution unit 125C executes a command in accordance with the mode on the basis of the gesture recognized by the gesture recognition unit 124C. As a result, the command in accordance with the mode is executed. Note that the above mainly assumes a case where a relative velocity in accordance with a mode is calculated. However, the method of calculating the relative velocity may be determined on the basis of other pieces of information.

Alternatively, in a case where a predetermined gesture (e.g., a gesture of touching an object) has been recognized from predetermined data (e.g., an image obtained by the input unit 120), the mode selection unit 126 may determine the center of the hand as the reference point and the fingertip as the operation point. For example, the gesture of touching an object may be a gesture of touching a table surface.

The configuration example of the information processing system 100C according to the fourth embodiment of the present disclosure has been described above.

4.2. Operation Example of Information Processing System

Figure 23:
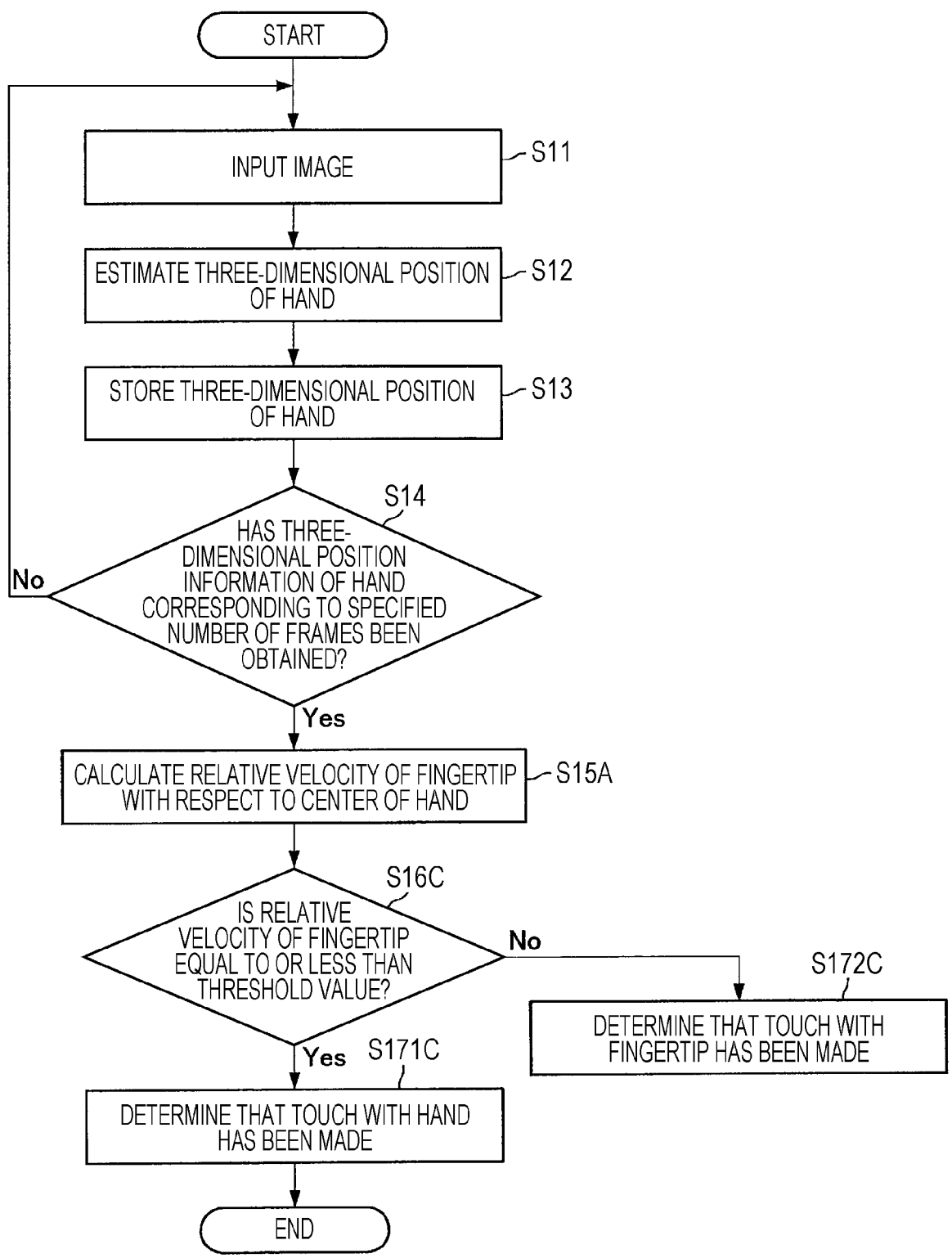
FIG. 23 is a flowchart illustrating an operation example of the information processing system according to the same embodiment.

Next, an operation example of the information processing system 100C according to the fourth embodiment of the present disclosure will be described. FIG. 23 is a flowchart illustrating the operation example of the information processing system 100C according to the fourth embodiment of the present disclosure. S11 to S14 illustrated in FIG. 23 may be executed in a similar manner to those in the operation example (S11 to S14 illustrated in FIG. 18) of the information processing system 100A according to the second embodiment of the present disclosure. In the fourth embodiment of the present disclosure, in a similar manner to the second embodiment of the present disclosure, it is sufficient if the three-dimensional position of each of the center of the hand and the fingertip is estimated by a three-dimensional position estimation unit 121.

The gesture recognition unit 124C recognizes a gesture of the operation body on the basis of the relative velocity of the operation point with respect to the reference point of the operation body calculated by the relative velocity calculation unit 123A. More specifically, in a case where the relative velocity of the fingertip with respect to the center of the hand exceeds the threshold value ("No" in S16C), the gesture recognition unit 124A recognizes a touch with the fingertip on an object OB as an example of a first gesture (S172C), and the command execution unit 125C executes a command to select the object OB in accordance with the position of the fingertip.

On the other hand, in a case where the relative velocity of the fingertip with respect to the center of the hand is equal to or less than the threshold value ("Yes" in S16), the gesture recognition unit 124C recognizes a touch with the hand (or palm) on the object OB as an example of a second gesture different from the first gesture. Then, the command execution unit 125C executes a command to move the object OB in accordance with the position of the hand (or palm). Note that, in a case where the relative velocity of the fingertip with respect to the center of the hand is equal to the threshold value, the first gesture may be recognized.

The operation example of the information processing system 100C according to the fourth embodiment of the present disclosure has been described above.

5. Fifth Embodiment

5.1. Configuration Example of Information Processing System

Next, a configuration example of an information processing system according to a fifth embodiment of the present disclosure will be described.

As illustrated in FIG. 16, an information processing apparatus 140D of an information processing system 100D according to the fifth embodiment of the present disclosure differs from the information processing apparatus 140A of the information processing system 100A according to the second embodiment of the present disclosure in that a three-dimensional position estimation unit 121D, a relative velocity calculation unit 123D, a gesture recognition unit 124D, and a command execution unit 125D are included in place of the three-dimensional position estimation unit 121, the relative velocity calculation unit 123A, the gesture recognition unit 124A, and the command execution unit 125A. Therefore, in the following description, the three-dimensional position estimation unit 121D, the relative velocity calculation unit 123D, the gesture recognition unit 124D, and the command execution unit 125D will be mainly described, and detailed description of other configurations included in the information processing system 100D according to the fifth embodiment of the present disclosure will be omitted.

Figure 24:
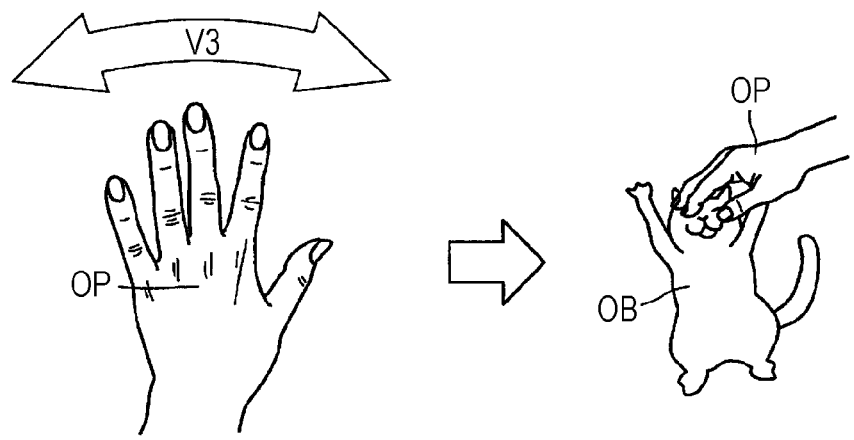
FIG. 24 is a diagram for describing a function of the information processing system according to the fifth embodiment of the present disclosure.
Figure 25:
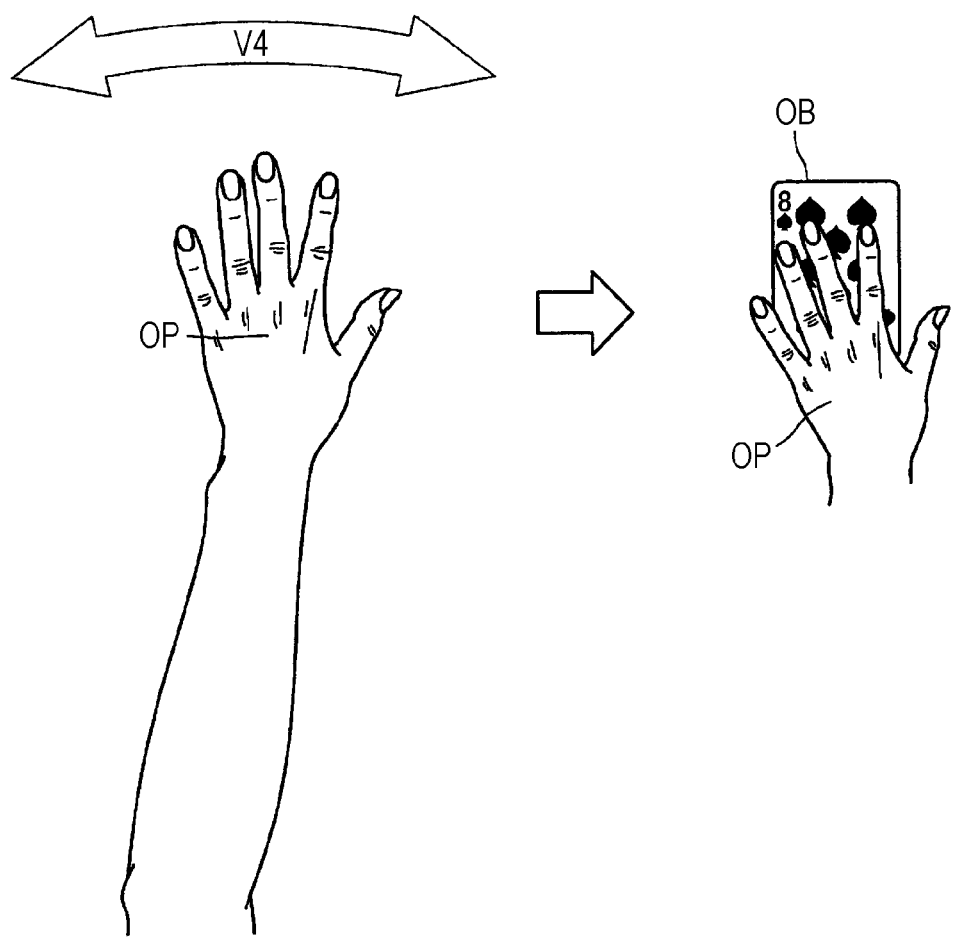
FIG. 25 is a diagram for describing a function of the information processing system according to the same embodiment.

FIGS. 24 and 25 are diagrams for describing a function of the information processing system 100D according to the fifth embodiment of the present disclosure. As illustrated in FIGS. 24 and 25, in the fifth embodiment of the present disclosure, a case is assumed in which the information processing apparatus 140D executes a game application on the basis of an operation by a user. That is, in the fifth embodiment of the present disclosure, a case is assumed in which an operation body OP is a user's hand. However, as described above, the operation body OP is not limited to a user's hand.

Furthermore, here, a case is assumed in which an object OB is a virtual object displayed by an output unit 130. However, the object OB is not limited to a virtual object but may be a real object. Moreover, here, a case is assumed in which a reference point of the operation body OP is a predetermined point on the wrist (here, the wrist position P12 or the wrist position P13 (FIGS. 7 and 8)), and an operation point of the operation body OP is a predetermined point on the palm (here, the position of the center of the hand). However, in place of the predetermined point on the wrist, a predetermined point on the elbow (e.g., the elbow joint position P15 (FIG. 9)) may be used, or a predetermined point on the shoulder (e.g., a shoulder joint position) may be used. Furthermore, as described above, the position of the center of the hand is not limited to a specific position.

The three-dimensional position estimation unit 121D estimates a three-dimensional position of each of the wrist and the center of the hand on the basis of input information obtained by an input unit 120. The three-dimensional position estimation unit 121D causes a storage unit 128 to store information regarding the estimated three-dimensional position of each of the wrist and the center of the hand. Note that, here, a case is assumed in which the three-dimensional position estimation unit 121D estimates the three-dimensional position of each of the wrist and the center of the hand. Alternatively, the three-dimensional position estimation unit 121D may estimate a two-dimensional position of each of the wrist and the center of the hand (e.g., a two-dimensional position on a plane parallel to the display surface of the object OB).

In a case where a frame count determination unit 122 determines that three-dimensional position information corresponding to a predetermined number of frames has been obtained, the relative velocity calculation unit 123D calculates the relative velocity of the operation point of the operation body with respect to the reference point of the operation body on the basis of the absolute velocity of each point on the operation body. Here, a case is assumed in which the relative velocity calculation unit 123D calculates a relative velocity of the center of the hand with respect to the wrist.

The gesture recognition unit 124D recognizes a gesture of the operation body on the basis of the relative velocity of the operation point with respect to the reference point calculated by the relative velocity calculation unit 123D. Here, in a case where the relative velocity of the center of the hand with respect to the wrist exceeds a threshold value, the gesture recognition unit 124D recognizes a gesture of waving a hand with the wrist as a fulcrum as a first gesture. On the other hand, in a case where the relative velocity of the center of the hand with respect to the wrist is equal to or less than the threshold value, the gesture recognition unit 124D recognizes a gesture of waving a hand with the elbow as a fulcrum as a second gesture. Note that, in a case where the shoulder is used in place of the elbow, the shoulder can be the fulcrum.

In the example illustrated in FIG. 24, a case is assumed in which a hand is waved with the wrist as a fulcrum for the purpose of stroking an object OB (operation body OP). At this time, a relative velocity V3 of the palm with respect to the elbow has a relatively small value, but the relative velocity of the palm with respect to the wrist has a relatively large value. On the other hand, in the example illustrated in FIG. 25, a case is assumed in which the hand is waved with the elbow as a fulcrum for the purpose of moving an object OB (operation body OP). At this time, a relative velocity V4 of the palm with respect to the elbow has a relatively large value, but the relative velocity of the palm with respect to the wrist has a relatively small value. In the gesture recognition according to the fifth embodiment of the present disclosure, since a gesture with respect to an object is determined on the basis of the relative velocity of the palm with respect to the wrist, it is possible to recognize the gesture with high accuracy.

The command execution unit 125D executes a command corresponding to the gesture recognized by the gesture recognition unit 124D. Here, the type of command executed by the command execution unit 125D is not limited. For example, a command corresponding to the gesture of waving a hand with the wrist as a fulcrum may include a command to stroke the object OB. That is, in a case where a gesture of waving a hand with the wrist as a fulcrum has been recognized, the command execution unit 125D may execute a command to stroke the object OB. On the other hand, a command corresponding to the gesture of waving a hand with the elbow as a fulcrum may include a command to move the object OB. That is, in a case where a gesture of waving a hand with the elbow as a fulcrum has been recognized, the command execution unit 125D may execute a command to move the object OB.

Note that the command corresponding to the gesture of waving a hand with the wrist as a fulcrum may include a command to erase a part of an object. On the other hand, the command corresponding to the gesture of waving a hand with the elbow as a fulcrum may include a command to erase the entire object. For example, in a case where a drawing application is executed, the command corresponding to the gesture of waving a hand with the wrist as a fulcrum may include a command to erase a part of a drawing. On the other hand, in a case where a drawing application is executed, the command corresponding to the gesture of waving a hand with the wrist as a fulcrum may include a command to erase the entire drawing.

Furthermore, the fifth embodiment of the present disclosure may be combined with the third embodiment of the present disclosure. That is, the information processing apparatus 140D according to the fifth embodiment of the present disclosure may include a mode selection unit 126. In such a case, the relative velocity calculation unit 123D calculates a relative velocity in accordance with a mode on the basis of an image obtained by the input unit 120. As a result, a relative velocity in accordance with the mode is calculated. Specifically, the mode selection unit 126 may determine a reference point and an operation point in accordance with the mode. For example, in a case where a game application is executed on the basis of an operation by a user, the mode selection unit 126 may determine the wrist as the reference point and the center of the hand as the operation point.

The gesture recognition unit 124D recognizes a gesture in accordance with the mode on the basis of the relative velocity calculated by the relative velocity calculation unit 123D. As a result, the gesture in accordance with the mode is recognized. The command execution unit 125D executes a command in accordance with the mode on the basis of the gesture recognized by the gesture recognition unit 124D. As a result, the command in accordance with the mode is executed. Note that the above mainly assumes a case where a relative velocity in accordance with a mode is calculated. However, the method of calculating the relative velocity may be determined on the basis of other pieces of information.

The configuration example of the information processing system 100D according to the fifth embodiment of the present disclosure has been described above.

5.2. Operation Example of Information Processing System

Figure 26:
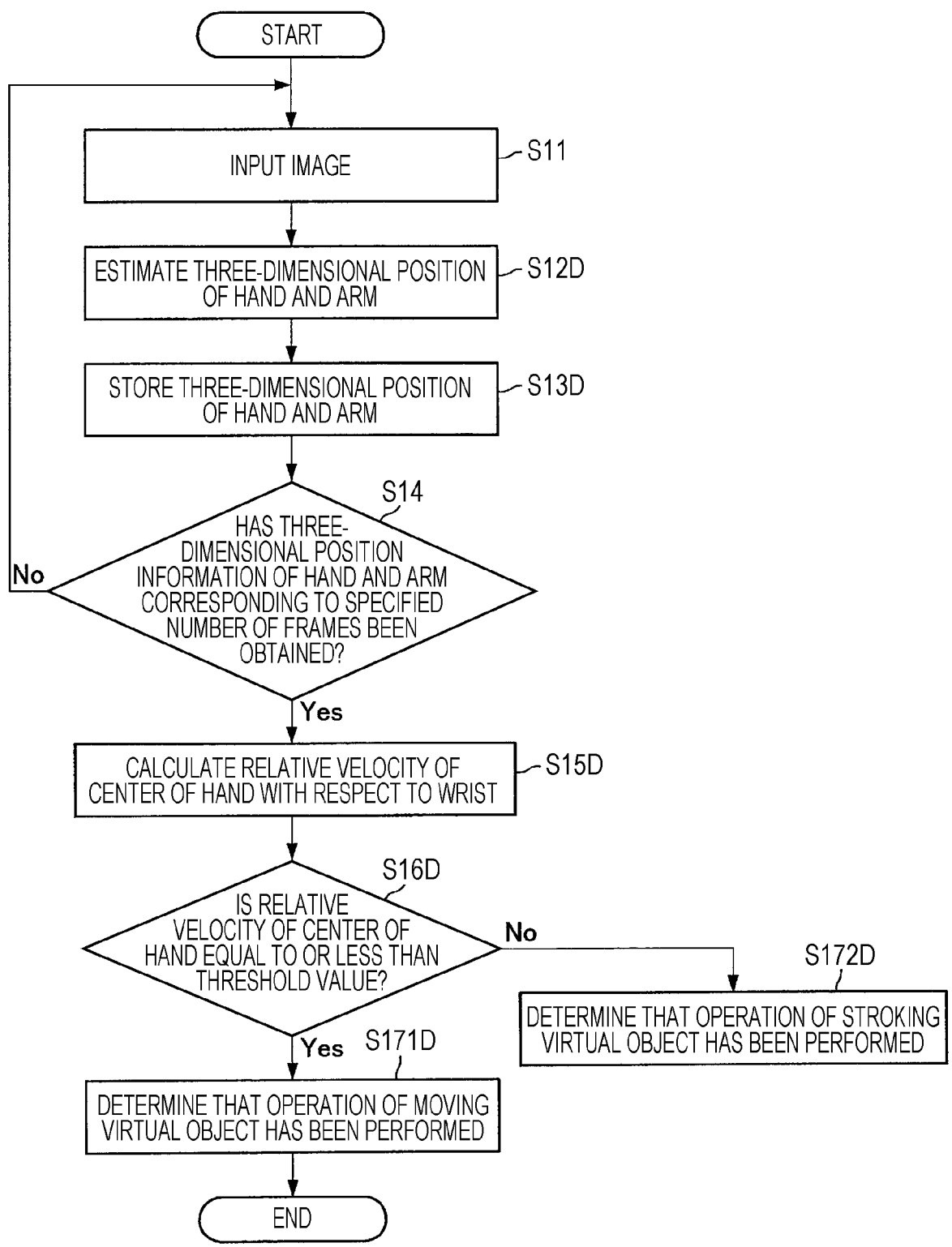
FIG. 26 is a flowchart illustrating an operation example of the information processing system according to the same embodiment.

Next, an operation example of the information processing system 100D according to the fifth embodiment of the present disclosure will be described. FIG. 26 is a flowchart illustrating the operation example of the information processing system 100D according to the fifth embodiment of the present disclosure. The input unit 120 inputs (acquires) an image by sensing a user's hand and arm as an example of the operation body in chronological order (S11). The three-dimensional position estimation unit 121D estimates three-dimensional positions of points on the hand and arm on the basis of the image obtained by the input unit 120 (S12D). Note that the points whose three-dimensional positions are to be estimated by the three-dimensional position estimation unit 121D may include the user's wrist and the center of the hand, but are not particularly limited as described above.

Next, the three-dimensional position estimation unit 121D stores the three-dimensional position of the hand and arm in the storage unit 128 (S13D). The frame count determination unit 122 determines whether three-dimensional position information corresponding to a specified number of frames (predetermined number of frames) has been obtained by the three-dimensional position estimation unit 121 (S14). In a case where three-dimensional position information corresponding to the specified number of frames (predetermined number of frames) has not been obtained by the three-dimensional position estimation unit 121 ("No" in S14), the frame count determination unit 122 returns to S11. On the other hand, in a case where three-dimensional position information corresponding to the specified number of frames (predetermined number of frames) has been obtained by the three-dimensional position estimation unit 121D ("Yes" in S14), the frame count determination unit 122 shifts the operation to S15D.

The relative velocity calculation unit 123D calculates the absolute position of each of the wrist and the center of the hand on the basis of the three-dimensional position information of each point on the hand and arm stored by the storage unit 128. Then, the relative velocity calculation unit 123D calculates the absolute velocity of each of the wrist and the center of the hand on the basis of a change in the time direction of the three-dimensional position of each of the wrist and the center of the hand. Then, the relative velocity calculation unit 123D calculates the relative velocity of the operation point (the center of the hand) of the hand and arm with respect to the reference point (wrist) of the hand and arm on the basis of the absolute velocity of each of the wrist and the center of the hand (S15D).

The gesture recognition unit 124D recognizes a gesture of the operation body on the basis of the relative velocity of the operation point with respect to the reference point of the operation body calculated by the relative velocity calculation unit 123D. More specifically, in a case where the relative velocity of the center of the hand with respect to the wrist exceeds the threshold value ("No" in S16D), the gesture recognition unit 124D recognizes a gesture of waving a hand with the wrist as a fulcrum as an example of a first gesture. Then, the command execution unit 125D determines that an operation of stroking a virtual object (object OB) in accordance with the position of the center of the hand has been performed (S172D), and executes a command corresponding to the operation.

On the other hand, in a case where the relative velocity of the center of the hand with respect to the wrist is equal to or less than the threshold value ("Yes" in S16D), the gesture recognition unit 124D recognizes a gesture of waving a hand with the elbow as a fulcrum as an example of a second gesture different from the first gesture. Then, the command execution unit 125D determines that an operation of moving a virtual object (object OB) in accordance with the position of the center of the hand has been performed (S171D), and executes a command corresponding to the operation. Note that, in a case where the relative velocity of the center of the hand with respect to the wrist is equal to the threshold value, the first gesture may be recognized.

The operation example of the information processing system 100D according to the fifth embodiment of the present disclosure has been described above.

6. Sixth Embodiment

6.1. Configuration Example of Information Processing System

Next, a configuration example of an information processing system according to a sixth embodiment of the present disclosure will be described.

As illustrated in FIG. 16, an information processing apparatus 140E of an information processing system 100E according to the sixth embodiment of the present disclosure differs from the information processing apparatus 140A of the information processing system 100A according to the second embodiment of the present disclosure in that a three-dimensional position estimation unit 121E, a relative velocity calculation unit 123E, a gesture recognition unit 124E, and a command execution unit 125E are included in place of the three-dimensional position estimation unit 121, the relative velocity calculation unit 123A, the gesture recognition unit 124A, and the command execution unit 125A. Therefore, in the following description, the three-dimensional position estimation unit 121E, the relative velocity calculation unit 123E, the gesture recognition unit 124E, and the command execution unit 125E will be mainly described, and detailed description of other configurations included in the information processing system 100E according to the sixth embodiment of the present disclosure will be omitted.

Figure 27:
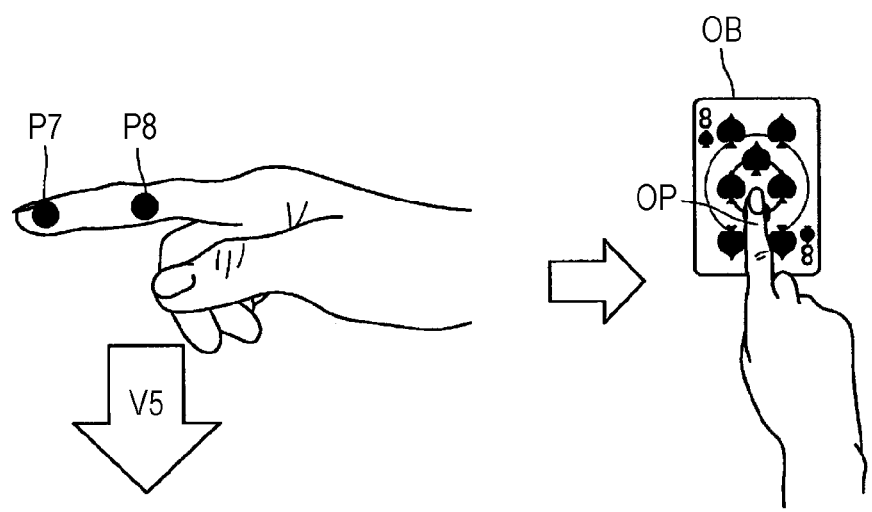
FIG. 27 is a diagram for describing a function of the information processing system according to the same embodiment.
Figure 28:
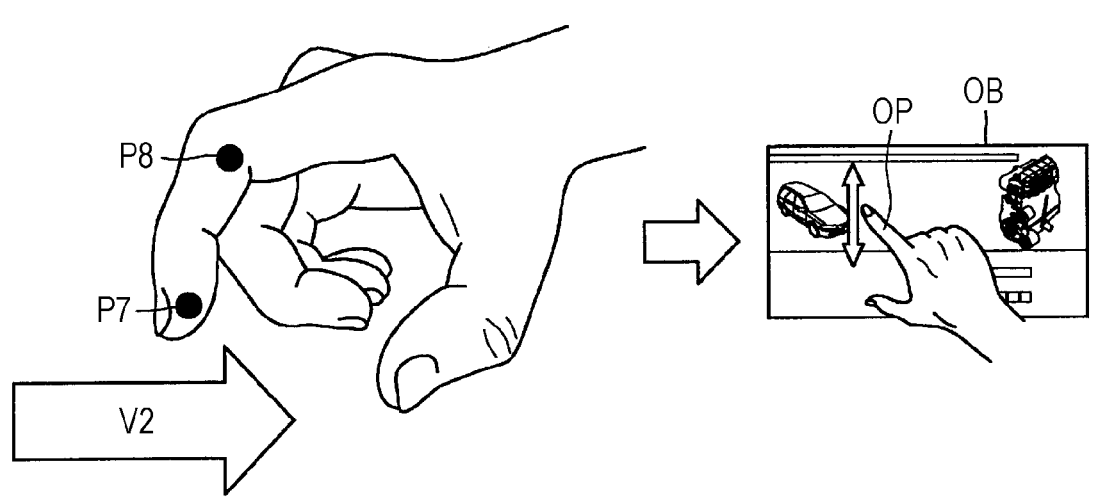
FIG. 28 is a diagram for describing a function of the information processing system according to the same embodiment.

FIGS. 27 and 28 are diagrams for describing a function of the information processing system 100E according to the sixth embodiment of the present disclosure. As illustrated in FIGS. 27 and 28, in the sixth embodiment of the present disclosure, a case is assumed in which the information processing apparatus 140E executes a game application on the basis of an operation by a user. That is, in the sixth embodiment of the present disclosure, a case is assumed in which an operation body OP is a user's hand. However, as described above, the operation body OP is not limited to a user's hand.

Furthermore, here, a case is assumed in which an object OB is a virtual object displayed by an output unit 130. However, the object OB is not limited to a virtual object but may be a real object. Moreover, here, a case is assumed in which a reference point of the operation body OP is a finger joint (here, the position P8 of the joint of the index finger (FIGS. 7 and 8)), and an operation point of the operation body OP is a fingertip (here, the position P7 of the tip of the index finger (FIGS. 7 and 8)).

The three-dimensional position estimation unit 121E estimates a three-dimensional position of a hand on the basis of input information obtained by an input unit 120. The three-dimensional position estimation unit 121E causes a storage unit 128 to store information regarding the estimated three-dimensional position of the hand. Note that, in the sixth embodiment of the present disclosure, the three-dimensional position estimation unit 121E is only required to estimate the three-dimensional position of each of the finger joint and the fingertip as the three-dimensional position of the hand.

In a case where a frame count determination unit 122 determines that three-dimensional position information corresponding to a predetermined number of frames has been obtained, the relative velocity calculation unit 123E calculates the relative velocity of the operation point of the operation body with respect to the reference point of the operation body on the basis of the absolute velocity of each point on the operation body. Here, a case is assumed in which the relative velocity calculation unit 123E calculates a relative velocity of the fingertip with respect to the finger joint.

The gesture recognition unit 124E recognizes a gesture of the operation body on the basis of the relative velocity of the operation point with respect to the reference point calculated by the relative velocity calculation unit 123E. Here, in a case where the relative velocity of the fingertip with respect to the finger joint exceeds a threshold value, the gesture recognition unit 124E recognizes a gesture of moving the fingertip with the finger joint as a fulcrum as a first gesture. On the other hand, in a case where the relative velocity of the fingertip with respect to the finger joint is equal to or less than the threshold value, the gesture recognition unit 124E recognizes a gesture of moving the fingertip with the finger base as a fulcrum as a second gesture.

In the example illustrated in FIG. 27, a case is assumed in which the fingertip is moved with the finger base as a fulcrum for the purpose of selecting an object OB. At this time, an absolute velocity V5 of the finger joint has a relatively large value, but the relative velocity of the fingertip with respect to the finger joint has a relatively small value. On the other hand, in the example illustrated in FIG. 28, a case is assumed in which the fingertip is moved with the finger joint as a fulcrum for the purpose of moving an object OB. At this time, the absolute velocity of the finger joint has a relatively small value, but a relative velocity V2 of the fingertip with respect to the finger joint has a relatively large value. In the gesture recognition according to the sixth embodiment of the present disclosure, since a gesture with respect to an object is determined on the basis of the relative velocity of the fingertip with respect to the finger joint, it is possible to recognize the gesture with high accuracy.

The command execution unit 125E executes a command corresponding to the gesture recognized by the gesture recognition unit 124E. Here, the type of command executed by the command execution unit 125E is not limited. For example, a command corresponding to the gesture of moving the fingertip with the finger base as a fulcrum may include a command to select the object OB. That is, in a case where a gesture of moving the fingertip with the finger base as a fulcrum has been recognized, the command execution unit 125E may execute a command to select the object OB. On the other hand, a command corresponding to a gesture of moving the fingertip with a finger joint point as a fulcrum may include a command to move the object OB. That is, in a case where a gesture of moving the fingertip with a finger joint point as a fulcrum has been recognized, the command execution unit 125E may execute a command to select the object OB.

Note that the sixth embodiment of the present disclosure may be combined with the third embodiment of the present disclosure. That is, the information processing apparatus 140E according to the sixth embodiment of the present disclosure may include a mode selection unit 126. In such a case, the relative velocity calculation unit 123E calculates a relative velocity in accordance with a mode on the basis of an image obtained by the input unit 120. As a result, a relative velocity in accordance with the mode is calculated. Specifically, the mode selection unit 126 may determine a reference point and an operation point in accordance with the mode. For example, in a case where a game application is executed on the basis of an operation by a user, the mode selection unit 126 may determine the finger joint as the reference point and the fingertip as the operation point.

The gesture recognition unit 124E recognizes a gesture in accordance with the mode on the basis of the relative velocity calculated by the relative velocity calculation unit 123E. As a result, the gesture in accordance with the mode is recognized. The command execution unit 125E executes a command in accordance with the mode on the basis of the gesture recognized by the gesture recognition unit 124E. As a result, the command in accordance with the mode is executed. Note that the above mainly assumes a case where a relative velocity in accordance with a mode is calculated. However, the method of calculating the relative velocity may be determined on the basis of other pieces of information.

For example, in a case where a predetermined gesture (e.g., a gesture of pointing) has been recognized from predetermined data (e.g., an image), the relative velocity calculation unit 123E may determine the finger joint as the reference point and the fingertip as the operation point. For example, the gesture of pointing may be a gesture of stretching out an index finger.

The configuration example of the information processing system 100E according to the sixth embodiment of the present disclosure has been described above.

6.2. Operation Example of Information Processing System

Figure 29:
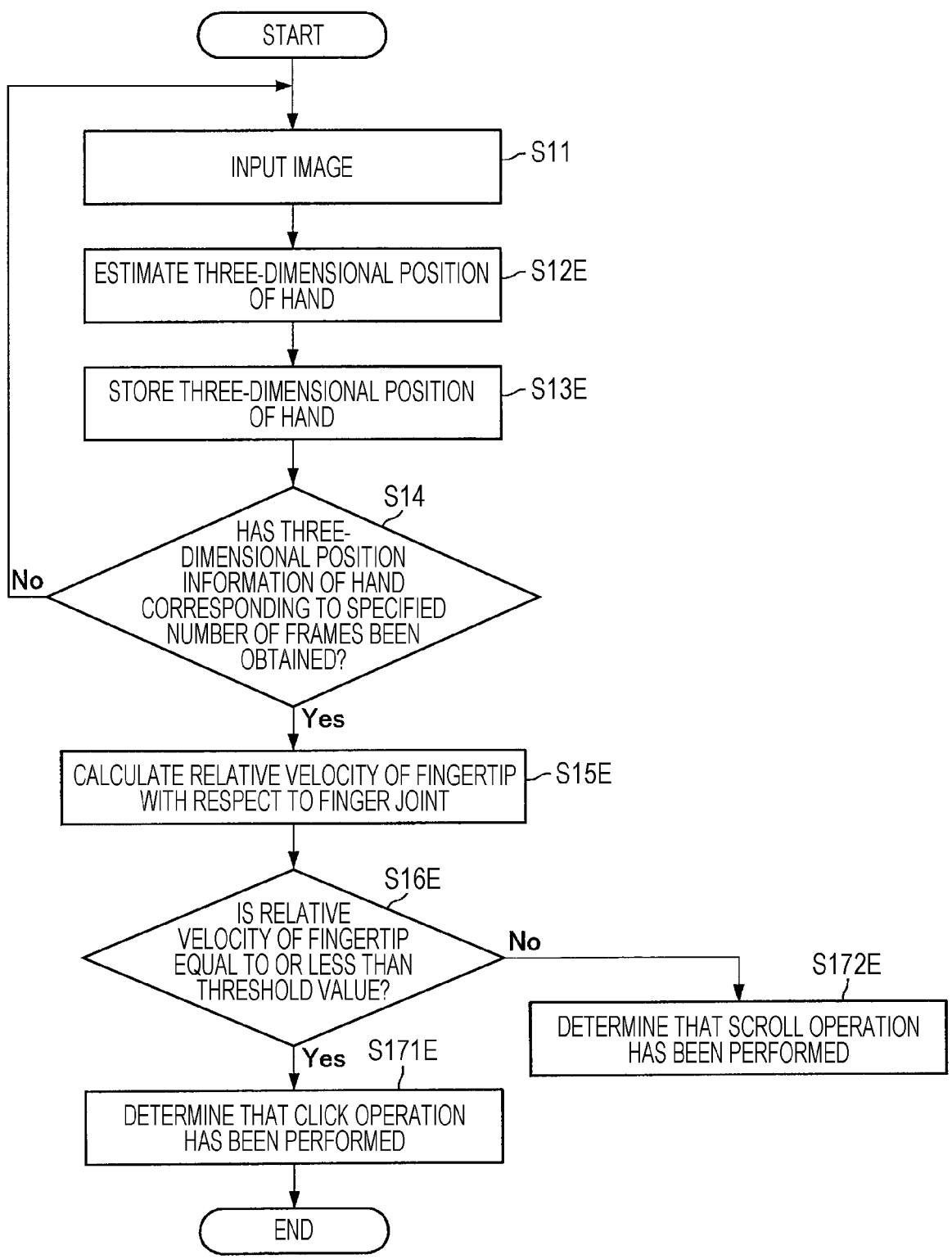
FIG. 29 is a flowchart illustrating an operation example of the information processing system according to the same embodiment.

Next, an operation example of the information processing system 100E according to the sixth embodiment of the present disclosure will be described. FIG. 29 is a flowchart illustrating the operation example of the information processing system 100E according to the sixth embodiment of the present disclosure. The input unit 120 inputs (acquires) an image by sensing a user's hand as an example of the operation body in chronological order (S11). The three-dimensional position estimation unit 121E estimates three-dimensional positions of points on the hand on the basis of the image obtained by the input unit 120 (S12E). Note that the points whose three-dimensional positions are to be estimated by the three-dimensional position estimation unit 121E may include the finger joint and the fingertip, but are not particularly limited as described above.

Next, the three-dimensional position estimation unit 121E stores the three-dimensional position of the hand in the storage unit 128 (S13E). The frame count determination unit 122 determines whether three-dimensional position information corresponding to a specified number of frames (predetermined number of frames) has been obtained by the three-dimensional position estimation unit 121 (S14). In a case where three-dimensional position information corresponding to the specified number of frames (predetermined number of frames) has not been obtained by the three-dimensional position estimation unit 121E ("No" in S14), the frame count determination unit 122 returns to S11. On the other hand, in a case where three-dimensional position information corresponding to the specified number of frames (predetermined number of frames) has been obtained by the three-dimensional position estimation unit 121E ("Yes" in S14), the frame count determination unit 122 shifts the operation to S15E.

The relative velocity calculation unit 123E calculates the absolute position of each of the finger joint and the fingertip on the basis of the three-dimensional position information of each point on the hand stored by the storage unit 128. Then, the relative velocity calculation unit 123E calculates the absolute velocity of each of the finger joint and the fingertip on the basis of a change in the time direction of the three-dimensional position of each of the finger joint and the fingertip. Then, the relative velocity calculation unit 123E calculates the relative velocity of the operation point (fingertip) of the hand with respect to the reference point (finger joint) of the hand on the basis of the absolute velocity of each of the finger joint and the fingertip (S15E).

The gesture recognition unit 124E recognizes a gesture of the operation body on the basis of the relative velocity of the operation point with respect to the reference point of the operation body calculated by the relative velocity calculation unit 123E. More specifically, in a case where the relative velocity of the fingertip with respect to the finger joint exceeds the threshold value ("No" in S16E), the gesture recognition unit 124E recognizes a gesture of moving the fingertip with the finger joint as a fulcrum (scroll operation) as an example of a first gesture (S172E), and the command execution unit 125E executes a command to move the object OB in accordance with the position of the fingertip.

On the other hand, in a case where the relative velocity of the fingertip with respect to the finger joint is equal to or less than the threshold value ("Yes" in S16E), the gesture recognition unit 124E recognizes a gesture of moving the fingertip with the finger base as a fulcrum (click operation) as an example of a second gesture different from the first gesture (S171E), and the command execution unit 125E executes a command to move the object OB in accordance with the position of the fingertip. Note that, in a case where the relative velocity of the fingertip with respect to the finger joint is equal to the threshold value, the first gesture may be recognized. According to the sixth embodiment of the present disclosure, in a case where a scroll operation has been recognized, it is possible to perform a control in which click operations are not to recognized, and an effect of improving accuracy of determining click operations can be enjoyed.

The operation example of the information processing system 100E according to the sixth embodiment of the present disclosure has been described above.

7. Seventh Embodiment

7.1. Configuration Example of Information Processing System

Next, a configuration example of an information processing system according to a seventh embodiment of the present disclosure will be described.

As illustrated in FIG. 16, an information processing apparatus 140F of an information processing system 100F according to the seventh embodiment of the present disclosure differs from the information processing apparatus 140A of the information processing system 100A according to the second embodiment of the present disclosure in that a three-dimensional position estimation unit 121F, a relative velocity calculation unit 123F, a gesture recognition unit 124F, and a command execution unit 125F are included in place of the three-dimensional position estimation unit 121, the relative velocity calculation unit 123A, the gesture recognition unit 124A, and the command execution unit 125A. Therefore, in the following description, the three-dimensional position estimation unit 121F, the relative velocity calculation unit 123F, the gesture recognition unit 124F, and the command execution unit 125F will be mainly described, and detailed description of other configurations included in the information processing system 100F according to the seventh embodiment of the present disclosure will be omitted.

Figure 30:
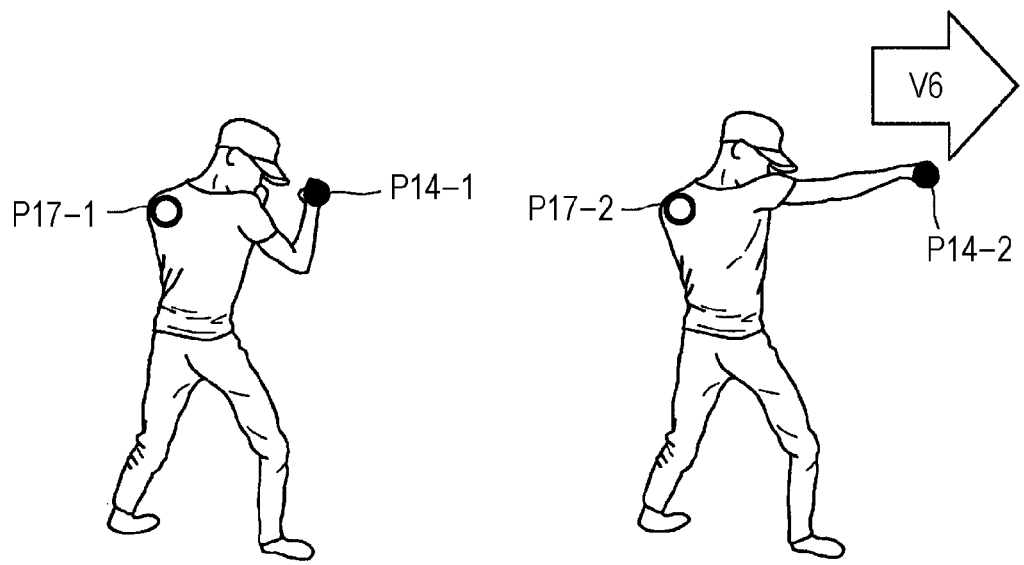
FIG. 30 is a diagram for describing a function of the information processing system according to the same embodiment.
Figure 31:
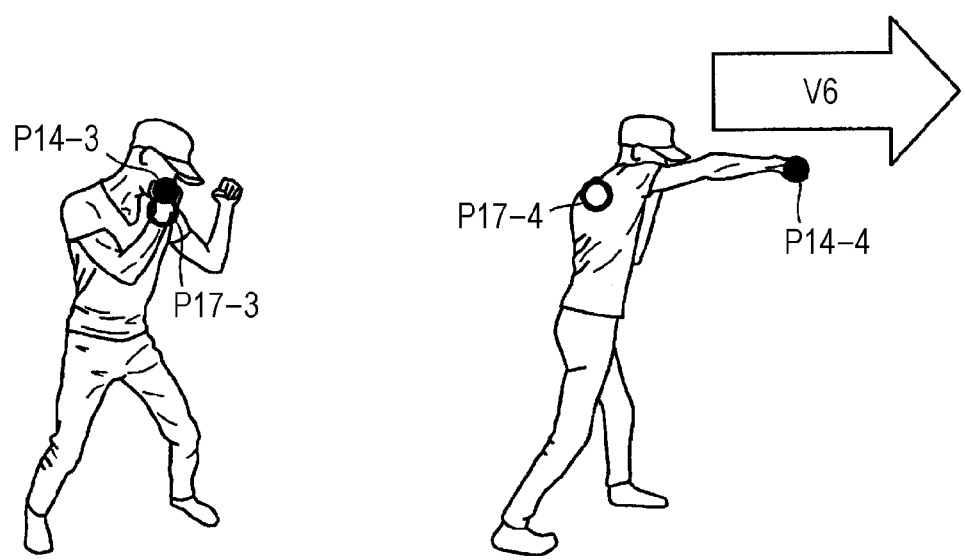
FIG. 31 is a diagram for describing a function of the information processing system according to the same embodiment.

FIGS. 30 and 31 are diagrams for describing a function of the information processing system 100F according to the seventh embodiment of the present disclosure. As illustrated in FIGS. 30 and 31, in the seventh embodiment of the present disclosure, a case is assumed in which the information processing apparatus 140F executes a game application on the basis of an operation by a user. That is, in the seventh embodiment of the present disclosure, a case is assumed in which an operation body is a part of a user's body (human body part). However, as described above, the operation body is not limited to a part of a user's body (human body part).

Furthermore, here, a case is assumed in which an object is a virtual object displayed by an output unit 130. However, the object is not limited to a virtual object but may be a real object. Moreover, here, a case is assumed in which a reference point of the operation body is a predetermined point on a shoulder (e.g., a shoulder joint position), and an operation point of the operation body is a predetermined point on a first (here, the position P14 of the center of the hand (FIGS. 7 and 8)). However, in place of the predetermined point on the shoulder (e.g., the shoulder joint position), a predetermined point on a part other than the shoulder (e.g., a foot) may be used.

The three-dimensional position estimation unit 121F estimates a three-dimensional position of a human body part on the basis of input information obtained by an input unit 120. The three-dimensional position estimation unit 121F causes a storage unit 128 to store information regarding the estimated three-dimensional position of the human body part. Note that, in the seventh embodiment of the present disclosure, the three-dimensional position estimation unit 121F is only required to estimate the three-dimensional position of each of the shoulder and the first as the three-dimensional position of human body part.

In a case where a frame count determination unit 122 determines that three-dimensional position information corresponding to a predetermined number of frames has been obtained, the relative velocity calculation unit 123F calculates the relative velocity of the operation point of the operation body with respect to the reference point of the operation body on the basis of the absolute velocity of each point on the operation body. Here, a case is assumed in which the relative velocity calculation unit 123F calculates a relative velocity of the first with respect to the shoulder.

The gesture recognition unit 124F recognizes a gesture of the operation body on the basis of the relative velocity of the operation point with respect to the reference point calculated by the relative velocity calculation unit 123F. Here, in a case where the relative velocity of the first with respect to the shoulder exceeds a threshold value, the gesture recognition unit 124F recognizes a first type of punch as a first gesture. On the other hand, in a case where the relative velocity of the first with respect to the shoulder is lower than the threshold value, the gesture recognition unit 124F recognizes a second type of punch as a second gesture.

In the example illustrated in FIG. 30, a case is assumed in which an attempt is made to throw a jab at an object. For example, it is assumed that the first used to throw the jab and the shoulder are on opposite sides of the body, in which the position of the shoulder moves from P17-1 to P17-2, and the position of the first moves from P14-1 to P14-2. At this time, a relative velocity V6 of the first with respect to the shoulder has a relatively small value. On the other hand, in the example illustrated in FIG. 31, a case is assumed in which an attempt is made to throw a straight punch at an object. For example, it is assumed that the first used to throw the straight punch and the shoulder are on opposite sides of the body, in which the position of the shoulder moves from P17-3 to P17-4, and the position of the first moves from P14-3 to P14-4. At this time, the relative velocity V6 of the first with respect to the shoulder has a relatively large value.

In the gesture recognition according to the seventh embodiment of the present disclosure, since a gesture with respect to an object is determined on the basis of the relative velocity of the first with respect to the shoulder, it is possible to recognize the gesture with high accuracy. Note that, for example, in a case where the first used to throw the jab and the shoulder are on the same side of the body, the relative velocity of the first with respect to the shoulder has a relatively large value. On the other hand, in a case where the first used to throw the straight punch and the shoulder are on the same side of the body, the relative velocity of the first with respect to the shoulder has a relatively small value.

The command execution unit 125F executes a command corresponding to the gesture recognized by the gesture recognition unit 124F. Here, the type of command executed by the command execution unit 125F is not limited. For example, a command corresponding to a jab may include a command to cause relatively small damage to the object. That is, in a case where a jab has been recognized, the command execution unit 125F may execute a command to cause relatively small damage to the object. On the other hand, a command corresponding to a straight punch may include a command to cause relatively large damage to the object. That is, in a case where a straight punch has been recognized, the command execution unit 125F may execute a command to cause relatively large damage to the object.

Note that the seventh embodiment of the present disclosure may be combined with the third embodiment of the present disclosure. That is, the information processing apparatus 140F according to the seventh embodiment of the present disclosure may include a mode selection unit 126. In such a case, the relative velocity calculation unit 123F calculates a relative velocity in accordance with a mode on the basis of an image obtained by the input unit 120. As a result, a relative velocity in accordance with the mode is calculated. Specifically, the mode selection unit 126 may determine a reference point and an operation point in accordance with the mode. For example, in a case where a game application is executed on the basis of an operation by a user, the mode selection unit 126 may determine the shoulder as the reference point and the first as the operation point.

The gesture recognition unit 124F recognizes a gesture in accordance with the mode on the basis of the relative velocity calculated by the relative velocity calculation unit 123F. As a result, the gesture in accordance with the mode is recognized. The command execution unit 125F executes a command in accordance with the mode on the basis of the gesture recognized by the gesture recognition unit 124F. As a result, the command in accordance with the mode is executed. Note that the above mainly assumes a case where a relative velocity in accordance with a mode is calculated. However, the method of calculating the relative velocity may be determined on the basis of other pieces of information.

The configuration example of the information processing system 100F according to the seventh embodiment of the present disclosure has been described above.

7.2. Operation Example of Information Processing System

Figure 32:
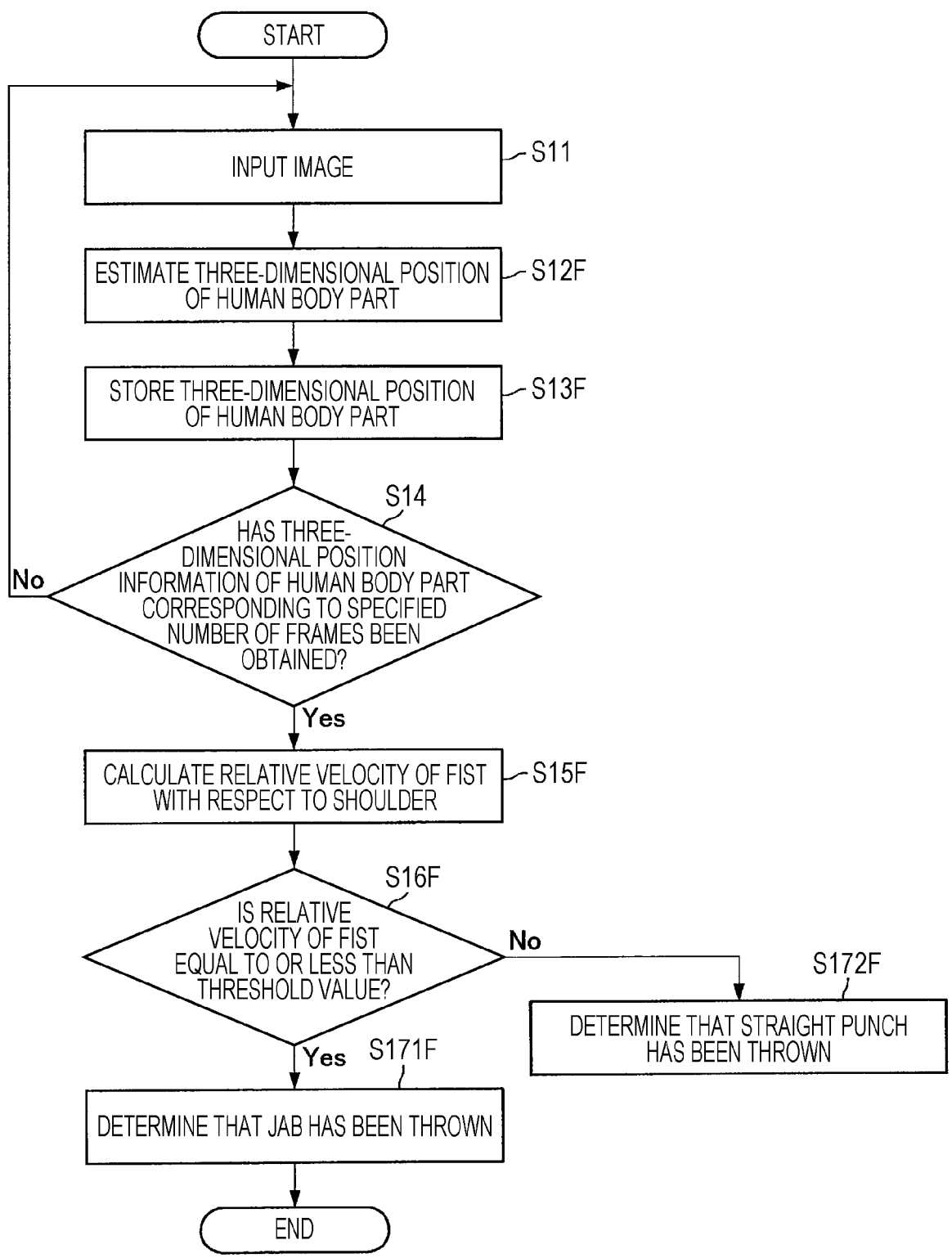
FIG. 32 is a flowchart illustrating an operation example of the information processing system according to the same embodiment.

Next, an operation example of the information processing system 100F according to the seventh embodiment of the present disclosure will be described. FIG. 32 is a flowchart illustrating the operation example of the information processing system 100F according to the seventh embodiment of the present disclosure. The input unit 120 inputs (acquires) an image by sensing a human body part of a user as an example of the operation body in chronological order (S11). The three-dimensional position estimation unit 121F estimates three-dimensional positions of points on the human body part on the basis of the image obtained by the input unit 120 (S12F). Note that the points whose three-dimensional positions are to be estimated by the three-dimensional position estimation unit 121F may include the shoulder and the fist, but are not particularly limited as described above.

Next, the three-dimensional position estimation unit 121F stores the three-dimensional position of the hand in the storage unit 128 (S13F). The frame count determination unit 122 determines whether three-dimensional position information corresponding to a specified number of frames (predetermined number of frames) has been obtained by the three-dimensional position estimation unit 121 (S14). In a case where three-dimensional position information corresponding to the specified number of frames (predetermined number of frames) has not been obtained by the three-dimensional position estimation unit 121F ("No" in S14), the frame count determination unit 122 returns to S11. On the other hand, in a case where three-dimensional position information corresponding to the specified number of frames (predetermined number of frames) has been obtained by the three-dimensional position estimation unit 121E ("Yes" in S14), the frame count determination unit 122 shifts the operation to S15F.

The relative velocity calculation unit 123F calculates the absolute position of each of the shoulder and the first on the basis of the three-dimensional position information of each point on the human body part stored by the storage unit 128. Then, the relative velocity calculation unit 123F calculates the absolute velocity of each of the shoulder and the first on the basis of a change in the time direction of the three-dimensional position of each of the shoulder and the fist. Then, the relative velocity calculation unit 123F calculates the relative velocity of the operation point (first) of the operation body with respect to the reference point (shoulder) of the operation body on the basis of the absolute velocity of each of the shoulder and the first (S15F).

The gesture recognition unit 124F recognizes a gesture of the operation body on the basis of the relative velocity of the operation point with respect to the reference point of the operation body calculated by the relative velocity calculation unit 123F. More specifically, in a case where the first used to throw the straight punch and the shoulder are on opposite sides of the body and the relative velocity of the first with respect to the shoulder exceeds the threshold value ("No" in S16F), the gesture recognition unit 124F recognizes a straight punch as an example of a first gesture (S172F), and the command execution unit 125F executes a command to cause relatively large damage to the object in accordance with the direction from the shoulder to the fist.

On the other hand, in a case where the first used to throw the jab and the shoulder are on opposite sides of the body and the relative velocity of the first with respect to the shoulder is equal to or less than the threshold value ("Yes" in S16F), the gesture recognition unit 124F recognizes a jab as an example of a second gesture different from the first gesture (S171F), and the command execution unit 125F executes a command to cause relatively small damage to the object in accordance with the direction from the shoulder to the fist.

Note that, in a case where the relative velocity of the first with respect to the shoulder is equal to the threshold value, the first gesture may be recognized. Furthermore, in a case where the first used to throw the straight punch and the shoulder are on the same side of the body and the relative velocity of the first with respect to the shoulder is equal to or less than the threshold value, the gesture recognition unit 124F may recognize a straight punch as an example of a second gesture. On the other hand, in a case where the first used to throw the jab and the shoulder are on the same side of the body and the relative velocity of the first with respect to the shoulder exceeds the threshold value, the gesture recognition unit 124F may recognize a jab as an example of a first gesture.

The operation example of the information processing system 100F according to the seventh embodiment of the present disclosure has been described above.

8. Hardware Configuration Example

Figure 33:
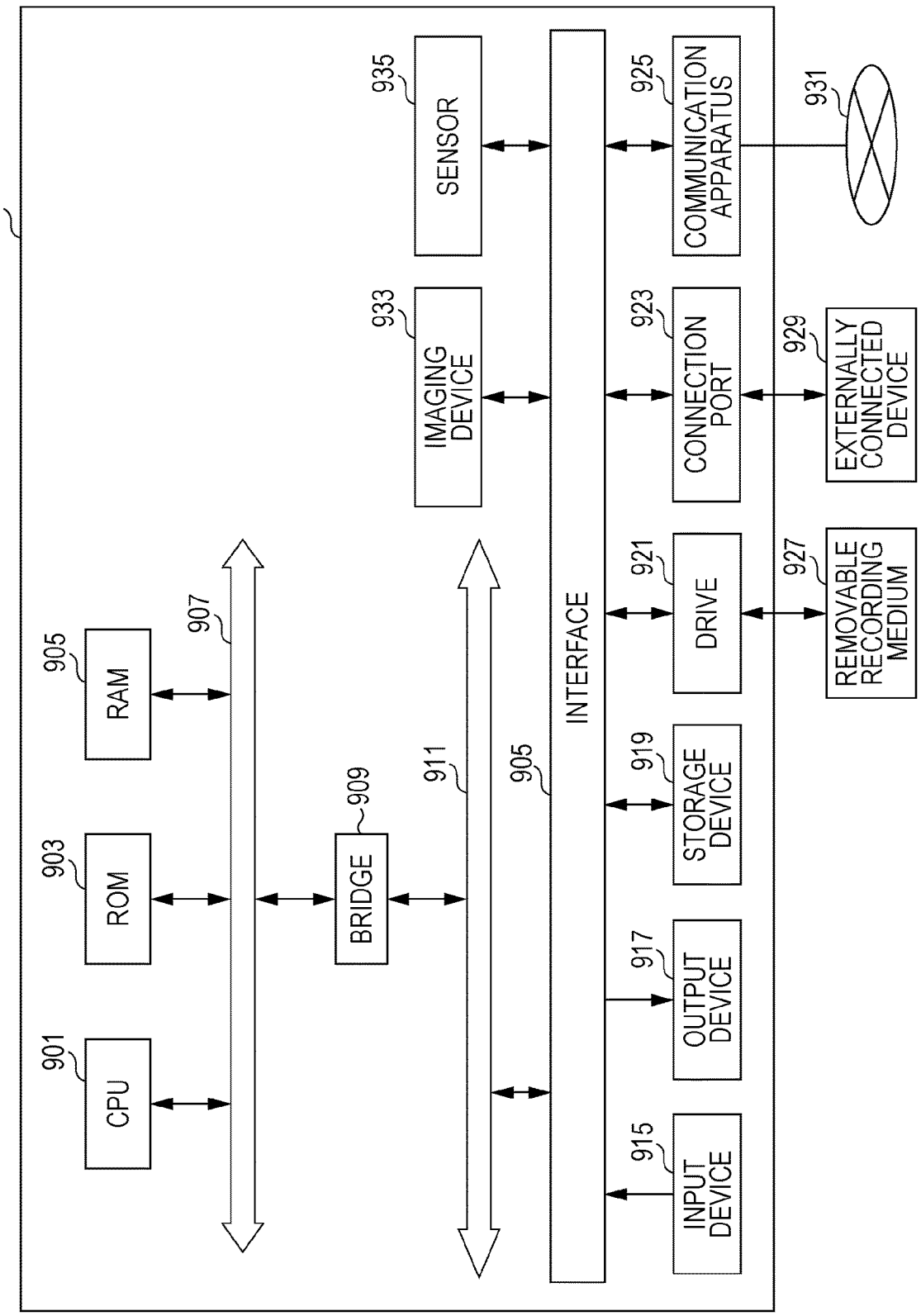
FIG. 33 is a block diagram illustrating a hardware configuration example of an information processing system.

Next, a hardware configuration of the information processing system 100 according to the embodiments of the present disclosure will be described with reference to FIG. 33. FIG. 33 is a block diagram illustrating a hardware configuration example of the information processing system 100 according to the embodiments of the present disclosure.

As illustrated in FIG. 33, the information processing system 100 includes a central processing unit (CPU) 901, a read only memory (ROM) 903, and a random access memory (RAM) 905. The CPU 901, the ROM 903, and the RAM 905 can constitute the three-dimensional position estimation unit 121, the frame count determination unit 122, the relative velocity/relative position calculation unit 123, the gesture recognition unit 124, and the command execution unit 125. Furthermore, the information processing system 100 may include a host bus 907, a bridge 909, an external bus 911, an interface 913, an input device 915, an output device 917, a storage device 919, a drive 921, a connection port 923, and a communication apparatus 925. Moreover, the information processing system 100 may include an imaging device 933 and a sensor 935 as needed. The information processing system 100 may include a processing circuit called a digital signal processor (DSP) or an application specific integrated circuit (ASIC) in place of or in combination with the CPU 901.

The CPU 901 functions as an arithmetic processing device and a control device, and controls the whole or a part of operation in the information processing system 100 in accordance with various programs recorded in the ROM 903, the RAM 905, the storage device 919, or a removable recording medium 927. The ROM 903 stores a program, an arithmetic parameter, and the like used by the CPU 901. The RAM 905 temporarily stores a program used for execution by the CPU 901, a parameter that changes during the execution as appropriate, and the like. The CPU 901, the ROM 903, and the RAM 905 are mutually connected by the host bus 907 constituted by an internal bus such as a CPU bus. Moreover, the host bus 907 is connected to the external bus 911 such as a peripheral component interconnect/interface (PCI) bus via the bridge 909.

The input device 915 is a device operated by a user, such as a button. The input device 915 may include a mouse, a keyboard, a touch panel, a switch, a lever, and the like. Furthermore, the input device 915 may include a microphone that detects a user's voice. The input device 915 may be, for example, a remote control device using infrared rays or other radio waves, or may be an externally connected device 929 such as a mobile phone that can be used to operate the information processing system 100. The input device 915 includes an input control circuit that generates an input signal on the basis of information input by a user and outputs the input signal to the CPU 901. The user operates the input device 915 to input various types of data to the information processing system 100 or give an instruction to perform a processing operation. Furthermore, the imaging device 933 described later can also function as an input device by imaging a movement of a user's hand, a user's finger, or the like. At this time, a pointing position may be determined in accordance with the movement of the hand or the direction of the finger. Note that the input device 915 may constitute the input unit 120 described above.

The output device 917 is constituted by a device capable of visually or aurally notifying a user of acquired information. The output device 917 may be, for example, a display device such as a liquid crystal display (LCD) or an organic electro-luminescence (EL) display, or a sound output device such as a speaker or headphones. Furthermore, the output device 917 may include a plasma display panel (PDP), a projector, a hologram, a printer device, or the like. The output device 917 outputs a result obtained by processing by the information processing system 100 as a video such as a text or an image, or as a sound such as voice or a sound effect. Furthermore, the output device 917 may include a lighting device or the like for brightening surroundings. Note that the output device 917 may constitute the output unit 130 described above.

The storage device 919 is a data storage device configured as an example of a storage unit of the information processing system 100. The storage device 919 is constituted by, for example, a magnetic storage device such as a hard disk drive (HDD), a semiconductor storage device, an optical storage device, or a magneto-optical storage device. The storage device 919 stores a program and various types of data to be executed by the CPU 901, various types of data acquired from the outside, and the like.

The drive 921 is a reader/writer for the removable recording medium 927 such as a magnetic disk, an optical disk, a magneto-optical disk, or a semiconductor memory, and is built in or externally attached to the information processing system 100. The drive 921 reads information recorded in the mounted removable recording medium 927, and outputs the information to the RAM 905. Furthermore, the drive 921 writes a record to the mounted removable recording medium 927.

The connection port 923 is a port for directly connecting a device to the information processing system 100. The connection port 923 may be, for example, a universal serial bus (USB) port, an IEEE1394 port, or a small computer system interface (SCSI) port. Furthermore, the connection port 923 may be an RS-232C port, an optical audio terminal, a high-definition multimedia interface (HDMI (registered trademark)) port, or the like. Connecting the externally connected device 929 to the connection port 923 allows various types of data to be exchanged between the information processing system 100 and the externally connected device 929.

Furthermore, the communication apparatus 925 is, for example, a communication interface constituted by a communication device or the like for connection to a network 931. The communication apparatus 925 may be, for example, a communication card for wired or wireless local area network (LAN), Bluetooth (registered trademark), or wireless USB (WUSB). Furthermore, the communication apparatus 925 may be a router for optical communication, a router for asymmetric digital subscriber line (ADSL), a modem for various communications, or the like. The communication apparatus 925 transmits and receives signals and the like to and from the Internet and other pieces of communication equipment by using a predetermined protocol such as TCP/IP. Furthermore, the network 931 connected to the communication apparatus 925 is a network connected by wire or wirelessly, and is, for example, the Internet, a home LAN, infrared communication, radio wave communication, or satellite communication.

The imaging device 933 is a device that images a real space and generates a captured image by using various members such as an imaging element such as a charge coupled device (CCD) or a complementary metal oxide semiconductor (CMOS) and a lens for controlling formation of a subject image on the imaging element. The imaging device 933 may capture a still image, or may capture a moving image.

The sensor 935 is various sensors such as a distance measuring sensor, an acceleration sensor, a gyro sensor, a geomagnetic sensor, a vibration sensor, an optical sensor, and a sound sensor. The sensor 935 acquires information regarding a state of the information processing system 100 itself, such as a posture of a housing of the information processing system 100, and information regarding a surrounding environment of the information processing system 100, such as brightness and noise around the information processing system 100.

Furthermore, the sensor 935 may include a GPS sensor that receives a global positioning system (GPS) signal and measures the latitude, longitude, and altitude of a device. Note that the sensor 935 may constitute the input unit 120 described above.

9. Conclusion

The embodiments of the present disclosure provide an information processing apparatus that includes a relative velocity calculation unit that calculates, on the basis of data obtained by sensing of an operation body in chronological order, a relative velocity of a second point on the operation body with respect to a first point on the operation body, and a gesture recognition unit that recognizes a gesture of the operation body on the basis of the relative velocity. According to such a configuration, a gesture made by an operation body can be recognized with higher accuracy.

The preferred embodiments of the present disclosure have been described above in detail with reference to the accompanying drawings, but the technical scope of the present disclosure is not limited to such examples. It is obvious that a person having ordinary knowledge in the technical field of the present disclosure can come up with various changes and modifications within the scope of the technical idea described in the claims, and such various changes and modifications are naturally understood to belong to the technical scope of the present disclosure.

For example, the position of each configuration is not particularly limited as long as the operation of the information processing system 100 described above is achieved. A part of the processing by each unit in the information processing system 100 may be performed by a server that is not illustrated.

Furthermore, the effects described in the present specification are merely illustrative or exemplary, and are not restrictive. That is, the technology according to the present disclosure can exhibit other effects that are obvious to those skilled in the art from the description in the present specification, in addition to or instead of the above effects.

Note that configurations as described below also belong to the technical scope of the present disclosure.

(1)

An information processing apparatus including:
a relative velocity calculation unit that calculates, on the basis of data obtained by sensing of an operation body in chronological order, a relative velocity of a second point on the operation body with respect to a first point on the operation body; and
a gesture recognition unit that recognizes a gesture of the operation body on the basis of the relative velocity.

(2)

The information processing apparatus according to (1), further including:
a command determination unit that determines a command corresponding to the gesture.

(3)

The information processing apparatus according to (1) or (2), in which
the data is two-dimensional data or three-dimensional data obtained by sensing of the operation body in chronological order.

(4)

The information processing apparatus according to any one of (1) to (3), further including:
a mode selection unit that selects a mode,
in which the relative velocity calculation unit calculates the relative velocity in accordance with the mode on the basis of the data.

(5)

The information processing apparatus according to any one of (1) to (4), in which
the gesture recognition unit recognizes a first gesture in a case where the relative velocity exceeds a threshold value, and recognizes a second gesture different from the first gesture in a case where the relative velocity is lower than the threshold value.

(6)

The information processing apparatus according to (5), in which
the first point is a predetermined point on a palm, and
the second point is a fingertip.

(7)

The information processing apparatus according to (6), in which
the gesture recognition unit recognizes a touch with the fingertip on an object as the first gesture in a case where the relative velocity exceeds the threshold value.

(8)

The information processing apparatus according to (7), in which
a command corresponding to a touch with the fingertip includes a command to output a sound corresponding to the object or a command to select the object.

(9)

The information processing apparatus according to (8), in which
the gesture recognition unit recognizes a touch with a palm on the object as the second gesture in a case where the relative velocity is lower than the threshold value.

(10)

The information processing apparatus according to (9), in which
a command corresponding to the touch with the palm includes a command to move the object.

(11)

The information processing apparatus according to (5), in which
the first point is a predetermined point on a wrist or an elbow, and
the second point is a predetermined point on a palm.

(12)

The information processing apparatus according to (11), in which
the gesture recognition unit recognizes, as the first gesture, a gesture of waving a hand with the wrist as a fulcrum in a case where the relative velocity exceeds the threshold value, and recognizes, as the second gesture, a gesture of waving the hand with the elbow or a shoulder as a fulcrum in a case where the relative velocity is lower than the threshold value.

(13)

The information processing apparatus according to (12), in which
a command corresponding to the gesture of waving the hand with the wrist as the fulcrum includes a command to stroke an object, and a command corresponding to the gesture of waving the hand with the elbow or the shoulder as the fulcrum includes a command to move the object.

(14)

The information processing apparatus according to (5), in which
the first point is a finger joint point, and
the second point is a fingertip.

(15)

The information processing apparatus according to (14), in which
the gesture recognition unit recognizes, as the first gesture, a gesture of moving the fingertip with a finger base as a fulcrum in a case where the relative velocity exceeds the threshold value, and recognizes, as the second gesture, a gesture of moving the fingertip with the finger joint point as a fulcrum in a case where the relative velocity is lower than the threshold value.

(16)

The information processing apparatus according to (15), in which
a command corresponding to the gesture of moving the fingertip with the finger base as the fulcrum includes a command to select an object, and a command corresponding to the gesture of moving the fingertip with the finger joint point as the fulcrum includes a command to move an object.

(17)

The information processing apparatus according to (5), in which
the first point is a predetermined point on a shoulder, and
the second point is a predetermined point on a fist.

(18)

The information processing apparatus according to (17), in which
the gesture recognition unit recognizes a first type of punch as the first gesture in a case where the relative velocity exceeds the threshold value, and recognizes a second type of punch as the second gesture in a case where the relative velocity is lower than the threshold value.

(19)
An information processing method including:
calculating, on the basis of data obtained by sensing of an operation body in chronological order, a relative velocity of a second point on the operation body with respect to a first point on the operation body; and
recognizing, by a processor, a gesture of the operation body on the basis of the relative velocity.

(20)
A program for causing a computer to function as an information processing apparatus, the information processing apparatus including:
a relative velocity calculation unit that calculates, on the basis of data obtained by sensing of an operation body in chronological order, a relative velocity of a second point on the operation body with respect to a first point on the operation body; and
a gesture recognition unit that recognizes a gesture of the operation body on the basis of the relative velocity.

REFERENCE SIGNS LIST

100 Information processing system
110 Table
120 Input unit
121 Three-dimensional position estimation unit
122 Frame count determination unit
123 Relative position/relative velocity calculation unit
124 Gesture recognition unit
125 Command execution unit
126 Mode selection unit
128 Storage unit
130 Output unit
140 Information processing apparatus

The invention claimed is:

1. An information processing apparatus, comprising:
an optical sensor configured to sense an operation body in chronological order to obtain data;
a relative velocity calculation unit configured to:
  determine, based on the obtained data, a position of each of:
    a first point on the operation body, and
    a second point on the operation body;
  determine an absolute velocity of each of the first point and the second point based on a change of the determined position of each of the first point and the second point; and
  calculate, based on the determined absolute velocity of each of the first point and the second point, a relative velocity of the second point on the operation body with respect to the first point on the operation body;
and a gesture recognition unit configured to:
  recognize a touch with the first point on an object as a first gesture in a case where the relative velocity exceeds a threshold value; and
  recognize a touch with the second point on the object as a second gesture in a case where the relative velocity is lower than the threshold value.

2. The information processing apparatus according to claim 1, further comprising a command determination unit configured to determine a command corresponding to the first gesture.

3. The information processing apparatus according to claim 1, wherein the data is one of two-dimensional data or three-dimensional data.

4. The information processing apparatus according to claim 1, further comprising a mode selection unit configured to select a mode, wherein the relative velocity calculation unit is further configured to calculate the relative velocity based on the mode.

5. The information processing apparatus according to claim 1, wherein
the first point is a specific point on a palm, and
the second point is a fingertip.

6. The information processing apparatus according to claim 5, wherein the gesture recognition unit is further configured to recognize a touch with the fingertip on the object as the first gesture in the case where the relative velocity exceeds the threshold value.

7. The information processing apparatus according to claim 6, wherein the touch with the fingertip corresponds to a command to output a sound corresponding to the object or a command to select the object.

8. The information processing apparatus according to claim 7, wherein the gesture recognition unit is further configured to recognize a touch with the palm on the object as the second gesture in the case where the relative velocity is lower than the threshold value.

9. The information processing apparatus according to claim 8, wherein the touch with the palm corresponds to a command to move the object.

10. The information processing apparatus according to claim 1, wherein
the first point is on a wrist or an elbow, and
the second point is on a palm.

11. The information processing apparatus according to claim 10, wherein the gesture recognition unit is further configured to:
  recognize, as the first gesture, a gesture of waving a hand with the wrist as a fulcrum, wherein the gesture of waving the hand with the wrist as the fulcrum is recognized as the first gesture in the case where the relative velocity exceeds the threshold value; and
  recognize, as the second gesture, a gesture of waving the hand with the elbow or a shoulder as the fulcrum, wherein the gesture of waving the hand with the elbow or the shoulder as the fulcrum is recognized as the second gesture in the case where the relative velocity is lower than the threshold value.

12. The information processing apparatus according to claim 11, wherein
the gesture of waving the hand with the wrist as the fulcrum corresponds to a command to stroke the object, and
the gesture of waving the hand with the elbow or the shoulder as the fulcrum corresponds to a command to move the object.

13. The information processing apparatus according to claim 1, wherein
the first point is a finger joint point, and
the second point is a fingertip.

14. The information processing apparatus according to claim 13, wherein the gesture recognition unit is further configured to:
  recognize, as the first gesture, a gesture to move the fingertip with a finger base as a fulcrum, wherein the gesture to move the fingertip with the finger base as the fulcrum is recognized as the first gesture in the case where the relative velocity exceeds the threshold value; and recognize, as the second gesture, a gesture to move the fingertip with the finger joint point as the fulcrum, wherein the gesture to move the fingertip with the finger joint point as the fulcrum is recognized as the second gesture in the case where the relative velocity is lower than the threshold value.

15. The information processing apparatus according to claim 14, wherein
the gesture to move the fingertip with the finger base as the fulcrum corresponds to a command to select the object, and
the gesture to move the fingertip with the finger joint point as the fulcrum corresponds to a command to move the object.

16. The information processing apparatus according to claim 1, wherein
the first point is on a shoulder, and
the second point is on a fist.

17. The information processing apparatus according to claim 16, wherein the gesture recognition unit is further configured to:
recognize a first type of punch as the first gesture in the case where the relative velocity exceeds the threshold value; and
recognize a second type of punch as the second gesture in the case where the relative velocity is lower than the threshold value.

18. An information processing method, comprising:
sensing an operation body in chronological order to obtain data;
optically determining, based on the obtained data, a position of each of:
a first point on the operation body, and
a second point on the operation body;
determining an absolute velocity of each of the first point and the second point based on a change of the determined position of each of the first point and the second point;
calculating, based on the determined absolute velocity of each of the first point and the second point, a relative velocity of the second point on the operation body with respect to the first point on the operation body;
recognizing a touch with the first point on an object as a first gesture in a case where the relative velocity exceeds a threshold value; and
recognizing a touch with the second point on the object as a second gesture in a case where the relative velocity is lower than the threshold value.

19. A non-transitory computer-readable medium having stored thereon computer-executable instructions that, when executed by a processor, cause the processor to execute operations, the operations comprising:
optically sensing an operation body in chronological order to obtain data;
determining, based on the obtained data, a position of each of:
a first point on the operation body, and
a second point on the operation body;
determining an absolute velocity of each of the first point and the second point based on a change of the determined position of each of the first point and the second point;
calculating, based on the determined absolute velocity of each of the first point and the second point, a relative velocity of the second point on the operation body with respect to the first point on the operation body;
recognizing a touch with the first point on an object as a first gesture in a case where the relative velocity exceeds a threshold value; and
recognizing a touch with the second point on the object as a second gesture in a case where the relative velocity is lower than the threshold value.

* * * * *